United States Patent [19]

Nakamura et al.

[11] Patent Number: 5,024,854
[45] Date of Patent: Jun. 18, 1991

[54] METHOD OF MANUFACTURING PERPENDICULAR TYPE MAGNETIC RECORDING MEMBER

[75] Inventors: Kyuzo Nakamura; Yoshifumi Ota; Taiki Yamada, all of Yachimata, Japan

[73] Assignee: Nihon Shinku Gijutsu Kabushiki Kaisha, Chigasaki, Japan

[21] Appl. No.: 412,535

[22] Filed: Sep. 22, 1989

Related U.S. Application Data

[63] Continuation of Ser. No. 587,742, Mar. 8, 1984, abandoned.

[30] Foreign Application Priority Data

Mar. 8, 1983 [JP] Japan .................................. 58-36652
Mar. 8, 1983 [JP] Japan .................................. 58-36653
Apr. 26, 1983 [JP] Japan .................................. 58-72075
May 18, 1983 [JP] Japan .................................. 58-85786
May 21, 1983 [JP] Japan .................................. 58-88389

[51] Int. Cl.$^5$ ............................................ H01F 10/02
[52] U.S. Cl. ..................................... 427/38; 204/192.2; 427/128; 427/129; 427/132; 427/250; 427/255.3; 427/296
[58] Field of Search ............................... 427/127-132, 427/48, 296, 38, 250, 255.3; 428/900, 694; 204/192.2

[56] References Cited

U.S. PATENT DOCUMENTS 4,198,467  4/1980  Reade ................................. 428/697
4,210,946  7/1980  Iwasaki et al. .................... 928/900
4,362,767  12/1982  Nouchi et al. ...................... 427/128

FOREIGN PATENT DOCUMENTS 684673  4/1964  Canada ............................ 427/255.3
116202  9/1979  Japan ............................... 427/255.3
152517  9/1982  Japan ............................... 428/694

OTHER PUBLICATIONS

Maeda et al. "Preparation of Perpendicularly Magentic Co-Cr Films by Vacuum Deposition" Japanese Journal of Applied Physics vol. 20, No. 7 (Jul. 1981) pp. 2467-2469.

Primary Examiner—Bernard Pianalto

[57] ABSTRACT

A perpendicular type magnetic recording member comprising a perpendicular-incidence magnetic film on a substrate, the perpendicular-incidence magnetic film comprising a magnetic metal and oxygen, the magnetic metal being selected from the group consisting of ferromagnetic alloys, alloys thereof and combinations thereof; and a method of manufacturing the perpendicular type recording member by utilizing vapor deposition techniques, which may include sputtering and ionization.

10 Claims, 14 Drawing Sheets

Saturation magnetization (KG)

$Hc_\perp/Hc_\parallel$ (m = 0.15)

$Br_\perp/Br_\parallel$ (m = 0.15)

$Hc\perp/Hc\|$ (m=0.25)

$Br\perp/Br\|$ (m=0.25)

Hc⊥/Hc∥ (m=0.40)

Br⊥/Br∥ (m=0.40)

METHOD OF MANUFACTURING PERPENDICULAR TYPE MAGNETIC RECORDING MEMBER

This application is a continuation of application Ser. No. 587,742 filed Mar. 8, 1984, now abandoned.

BACKGROUND OF THE INVENTION

This invention relates to a perpendicular type magnetic recording member and a manufacturing method therefor. Recently, a perpendicular type magnetic recording system and an optical magnetic recording system have attracted attention as new magnetic recording systems for high density recording. A magnetic film for these recording systems has to be a so-called perpendicular deposition magnetic film which has a magnetic anisotropy in the direction perpendicular to the plane of the film and has to satisfy the conditions of $Ku\perp \geq 2\pi Ms^2$, $Hc\perp > Hc\|$ and $Br\perp > Br\|$.

Co is known to have a large magneto crystalline anisotropy in the c axial direction of a hcp structure thereof. For obtaining a perpendicular deposition magnetic film by making use of the magnetic anisotropy of Co, it is necessary to satisfy the requirements: (1) that the direction of the c axis thereof is substantially perpendicular to the plane of the film and (2) that the crystal magnetic anisotropy energy Ku is larger than an energy of diamagnetic field $2\pi Ms^2$ generated in the direction perpendicular to the plane of the film. However, the Co film is large in the value of a saturation magnetization Ms, and therefore does not meet the foregoing requirement (2), so that a perpendicular deposition magnetic film cannot be made from Co.

There has also been known, as one of the perpendicular-incidence deposition magnetic films, a Co—Cr system thin film. This film has been made by an evaporation process. However, the evaporation process is defective in that the vapor pressure of Co and Cr are largely different from each other, and consequently it is difficult to keep a uniform Co—Cr composition ratio for a long period of time during manufacturing of the magnetic film thereof. Also, a uniform magnetic film of a Co—Cr having a perpendicular magnetic property can be obtained only when its evaporation deposition onto a substrate is carried out when the substrate is heated to 200°–300° C. In other words, the perpendicular-incidence deposition magnetic film cannot be obtained when the substrate is not heated. However, such heating results in curling of a tape-shaped substrate and warping of a substrate of a floppy disk. In order to prevent this, a heat resisting substrate has to be used, resulting in an increase in production cost.

SUMMARY OF THE INVENTION

A perpendicular type magnetic recording member comprising a perpendicular-incidence magnetic film on a substrate, the perpendicular-incidence magnetic film comprising a magnetic metal and oxygen, the magnetic metal being selected from the group consisting of ferromagnetic metals and alloys thereof; and a method of manufacturing the perpendicular type recording member.

An objective of this invention is to provide a perpendicular type recording member free from the above difficulties and is characterized in forming a perpendicular deposition magnetic film comprising a composition of magnetic metal (Me) and oxygen (where the magnetic metal (Me) represents any one kind or more selected from magnetic metals and magnetic alloys, on a substrate, either directly or through a soft magnetic material coating layer. As for the magnetic metal (Me) it typically includes Fe, Co, Ni, a mixture thereof, and any alloy thereof. The soft magnetic material coating layer may be a permalloy or an amorphous film made of Fe, Co, Co—Zr or the like.

Another objective of this invention is a method of manufacturing the above-described perpendicular type magnetic recording member. This method is characterized in that, while oxygen gas is introduced into a vacuum treatment chamber, a magnetic metal (Me) is vaporized so that atomic vapors thereof are deposited on a surface of a substrate at a substantially perpendicular-incidence angle to the surface thereof, and so that part of the metal vapors is oxidized; thereby, forming a perpendicular deposition magnetic film on the substrate represented by either a composition of $(Fe_xCo_yNi_z)_{1-m}O_m$, where $0 \leq x \leq 0.05$, $0 \leq z \leq 0.40$, $x+y+z=1$ and $0.15 \leq m \leq 0.50$, or a composition of $(Fe_xCo_yNi_z)_{1-m}O_m$, where $0.40 \leq x \leq 1.0$, $0 \leq z \leq 0.25$, $x+y+z=1$ and $0.25 \leq m \leq 0.50$.

Examples of this invention will be explained with reference to the attached drawings.

Initially, there will be explained a perpendicular type magnetic recording member having a perpendicular deposition magnetic film comprising a composition of Co and 15–50 at % 0, and a manufacturing method thereof.

Figure 1:
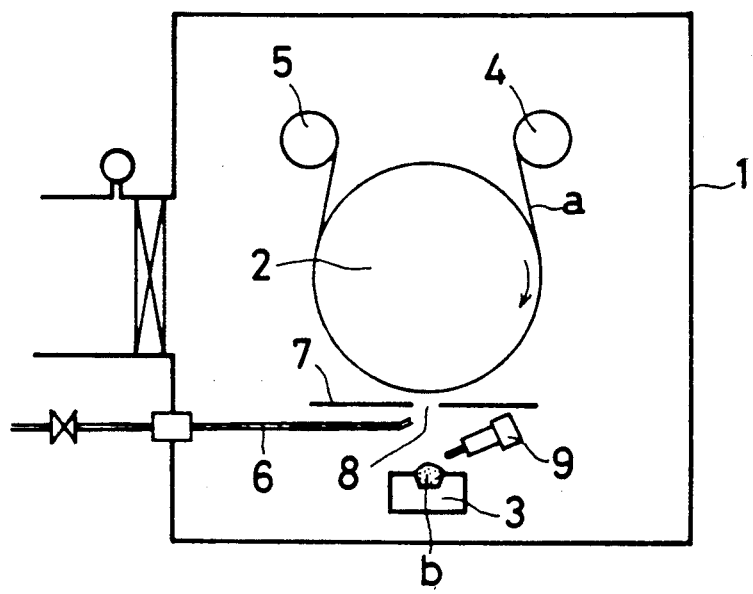
FIG. 1 is a side view of an apparatus for manufacturing a perpendicular type magnetic recording member according to this invention.

FIG. 1 shows a vacuum evaporation treatment apparatus for making the magnetic recording member of this invention comprising a vacuum treatment chamber 1, provided with a rotary cooling can 2 of cylindrical drum type and an electron beam evaporation source 3 comprising a crucible positioned just under the can 2. The chamber 1 is connected through a control valve to a vacuum pump (not shown). On respective sides of an upper space portion over the rotary can 2, an unwinding roller 4 and a winding roller 5 are disposed and are arranged to be rotated by a motor (not shown). A tape-shaped substrate a made of a non-magnetic material, such as a PET material, is mounted on the unwinding roller 4 and is arranged to be unrolled and run at a constant speed around a circumferential surface of the water-cooled can 2 and finally to be taken up by the winding roller 5. According to this invention, there is provided a supply pipe 6 for introducing oxygen into the chamber 1. A control valve may be interposed in pipe 6 as illustrated. The supply pipe 6 of an appropriate length is so that its open end is located near the surface of the running tape substrate a. Right and left vapor-adhesion shield plates 7 are so disposed as to leave a space interval 8 therebetween at which space the lowermost surface of the can 2 faces the evaporation source 3 below, so that Co atoms evaporated from the evaporation source 3 may pass through the space interval 8 and be deposited on the surface of the tape substrate a substantially perpendicular to the surface of the substrate a. The plate 7 may be arranged so that it can move to the right or left, if desired. An electron beam heating means 9 is also provided.

Figure 2A:
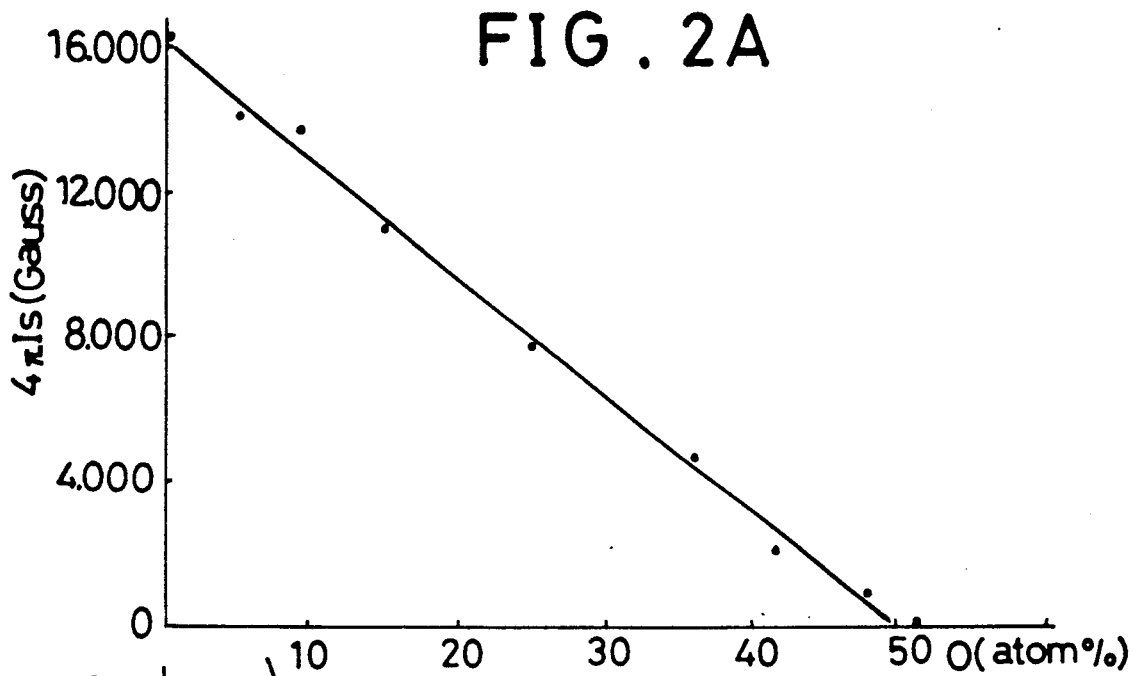
FIGS. 2A, 2B and 2C are diagrams showing the relationship between various Co—O compositions and the magnetic properties thereof.
Figure 2B:
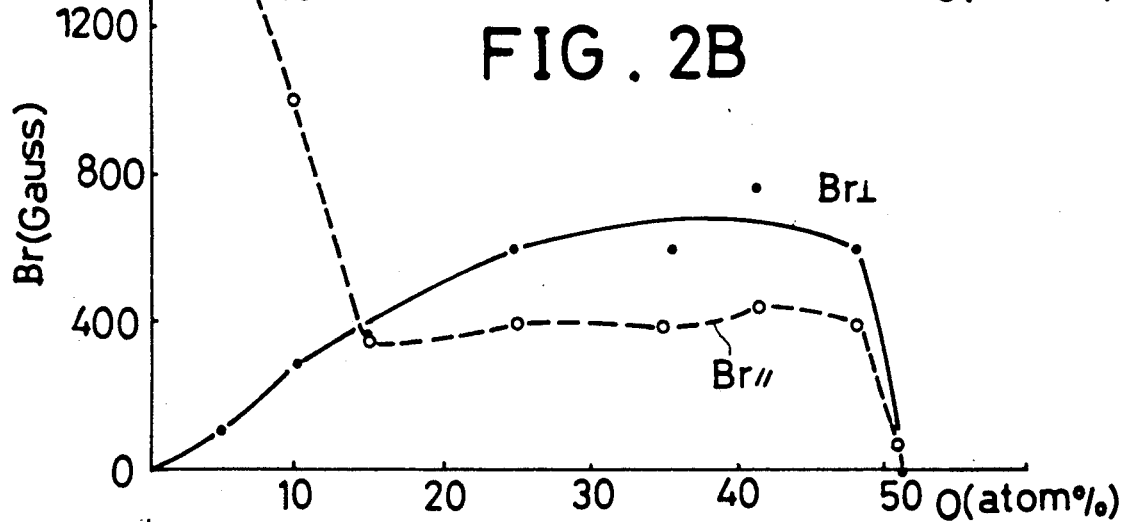
Figure 2C:
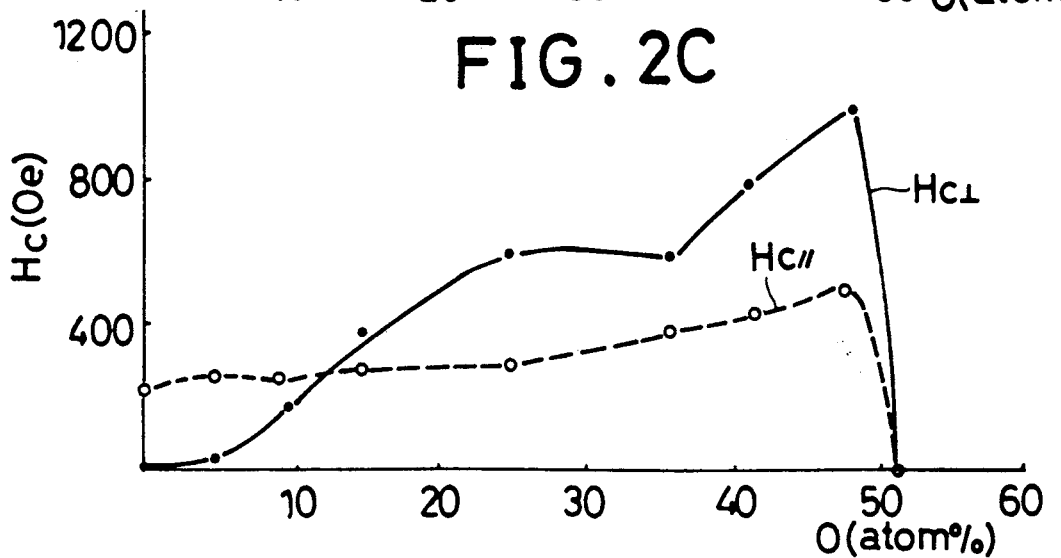

A magnetic recording member according to this invention can be manufactured by using the above-described apparatus as follows:

After the interior of the chamber 1 is evacuated to below $1 \times 10^{-5}$ Torr, a raw ferro-magnetic metal material b to be evaporated, Co metal, for instance, is caused to evaporate at a constant speed from the evaporation source 3 by electron beam heating; and at the same time, $O_2$ gas is introduced into the chamber 1 through the supply pipe 6 for oxidizing part of the Co vapors, and the partially oxidized Co vapors pass through the space 8 and deposits on a substrate a passing over on the lower surface of the cooled can 2 substantially perpendicular or normal incidence upon the substrate a, so that there is formed a perpendicular deposition magnetic film comprising a composition of Co—O on the surface of the tape substrate a. In this operation, by varying the amount of $O_2$ gas introduced, various partial pressures thereof can be obtained in the chamber. Thus, there can be manufactured a large number of perpendicular type magnetic recording members having Co—O perpendicular magnetic films comprising varying composition ratios of Co—O. Also, the resulting magnetic films may have a thickness in the range of 1000 Å–10000 Å, which is caused by varying the running speed of the tape substrate a. The magnetic properties of films obtained from varying the Co—O composition ratios were measured to determine the relationship between the Co—O composition ratios. These magnetic properties are shown in FIGS. 2A, 2B, 2C. As will be understood therefrom, as the O content is increased, both coercive force in the direction perpendicular to film surface $Hc\perp$ and a residual magnetic flux density $Br\perp$ thereof are increased, and if the O content becomes above 15 atom. %, both $Hc\perp$ and $Br\perp$ become higher than a coercive force in the direction parallel to film surface $Hc\parallel$ and a residual magnetic flux density of that $Br\parallel$ thereof, so that perpendicular deposition magnetic films can be obtained. However, if the O content is beyond 50 at %, the saturation magnetization value becomes zero, resulting in the loss of the magnetic properties of the film.

Figure 3:
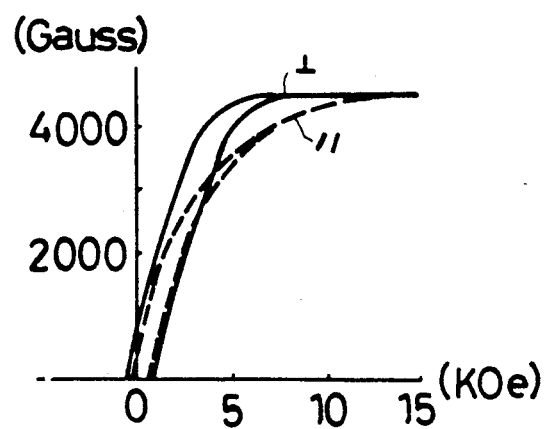
FIG. 3 is a diagram showing hysteresis loops of one example of a perpendicular magnetic films of this invention.

FIG. 3 shows hysteresis loops resulted from a perpendicular magnetic film comprising a typical composition of Co—36 at % O. From FIG. 3, it is understood that this film is a sufficiently perpendicular magnetic one. In the above manufacturing operation, the films having any predetermined compositions in the range of Co—15~50 at % O, can be also manufactured by varying the evaporation rate of Co while controlling the amount of $O_2$ gas introduced. The relationship between the two are generally in proportional to the incidence deposition frequencies of both the atoms upon the substrate, and therefore, if the Co evaporation rate is increased, it is necessary to increase the partial pressure of $O_2$. As is clear from FIG. 2C, the perpendicular magnetic films comprising the Co—15~50 at % O compositions according to this invention have excellent coercive forces $Hc\perp$ in the range of about 400–1000 Oe, which are the best values for a perpendicular magnetic film.

When a conventional magnetic recording member having the perpendicular deposition magnetic film comprising a Co—Cr composition are manufactured by the evaporation process, it is essential to deposit the Co and Cr atoms on a substrate which has been heated to 200°–300° C. Whereas, according to this invention, heating of the substrate is not required.

Namely, a good perpendicular type magnetic film can be obtained by the present invention even when the substrate is cooled or is not heated so as to remain at a normal temperature. Thus, this invention can eliminate the defect of the conventional process, which limits the kind of a substrate used therein to an expensive heat-resisting plastic film, such as polyimide or the like. In other words, according to this invention, the material used as the substrate is not limited, and therefore, an inexpensive material having no heat-resistance, such as a PET film or the like, can also be used, because a good perpendicular type magnetic film can be obtained without heating the substrate. However, in the present invention, the substrate may be heated, if desired.

Also, when manufacturing the conventional Co—Cr perpendicular type recording member by the evaporation process, control of the Cr composition ratio is difficult. Due to this difficulty, a uniform perpendicular magnetic film cannot be obtained in a continuous manufacturing operation over a long period of time. Also, the heating in the conventional process significantly curls or wraps the substrate. In contrast, the procedures of the present invention require maintaining a constant evaporation rate of Co and a constant flow rate of $O_2$ gas; whereby, it is very easy to form a uniform perpendicular magnetic film on a substrate over a long period of time. Also, in the present invention, curling and warping of the substrate hardly occur when the substrate is not heated. Thus, the present invention is very useful for manufacturing of a floppy disk and a magnetic tape, or the like.

The reason that the Co—O magnetic film of the present invention has the foregoing good magnetic properties is not clear but can be thought of as follows:

When the Co atoms are deposited on the substrate at substantially perpendicular-incidence angle thereto, there is formed a coating film having a columnar structure thereof in which the c axis of the hcp structure is oriented in the direction perpendicular to the plane of the film. During this evaporation, part of the evaporated Co atoms is oxidized by the introduced $O_2$ and the resultant CoO oxide or similar oxide is deposited on the substrate, so that there is formed such a film structure that the Co fine particles are coated with these non-magnetic oxides. Thus, the Co columnar particle has not only the magneto crystalline ahisotropy, but also, a shape anisotropy, whereby the perpendicular magnetic anisotropy of the film is imporved. With such a film structure, partially oxided as above, an average saturation magnetization value is lowered so as to meet the requirement of $Ku\perp \geq 2\pi Ms^2$, whereby the required perpendicular magnetic film can be obtained. The diameter of the columnar Co particle is considered to be about several hundreds Å- several thousands Å, and is a fine metal particle, and accordingly has a high coercive force.

A minor amount of one or more of other elements may be mixed in the foregoing Co—O perpendicular magnetic film. This includes elements which make solid solution with Co and do adversely effect the h c p structure. For example, Cr, V, Mo, W, Rh, Ti, Re, etc., may be included therewith in a minor amount.

In addition, it has been found that a perpendicular magnetic recording system, having an intermediate magnetic film interposed between a perpendicular magnetic film and a non-magnetic substrate, can decrease the electric current required for recording, while increasing reproduction out. This intermediate film may be formed from a permalloy or amorphous film of Fe, Co, Co—Zr, which has a comparatively soft magnetic property and a large saturation magnetization. Such a perpendicular magnetic recording member is manufactured by coating the foregoing intermediate magnetic film on a surface of the non-magnetic substrate, and then coating a perpendicular deposition magnetic film comprising a predetermined Co—O composition on a surface of the intermediate magnetic film, according to the above-described method of this invention.

Furthermore, when the present invention is used to manufacture a floppy disc, the above intermediate magnetic film may be formed on one or both surfaces of the substrate, and then the perpendicular magnetic film comprising a predetermined Co—O composition is formed on one or both surfaces of the intermediate magnetic film.

Another example of this invention will now be explained with reference to FIGS. 4–7. This example is directed to a perpendicular type magnetic recording member having a perpendicular deposition magnetic film comprising a predetermined Co—Ni—O composition and a manufacturing method thereof. Namely, the Co—Ni—O composition is $(Co_{1-z}Ni_z)_{1-m}O_m$, wherein $0 < z < 0.40$ and $0.15 < m < 0.50$. The perpendicular type magnetic recording member having a perpendicular magnetic film comprising the foregoing Co—Ni—O composition is manfuactured by using the apparatus shown in FIG. 1 and in almost the same manner as the first embodiment of this invention. Namely, after the interior of the chamber 1 is evacuated to be below $1 \times 10^{-5}$ Torr, a Co—Ni alloy or a mixture of Co and Ni metals mixed in a predetermined ratio is evaporated at a constant rate by an electric beam heating means, while $O_2$ gas is introduced into the chamber 1 through the pipe 6, so that partially oxidized vapors of Co and Ni are deposited on a surface of the subsrate a running at a constant speed, substantially perpendicularly or normally thereto; thereby, forming a perpendicular deposition magnetic film comprising a predetermined Co—Ni—O composition.

In this manufacturing method, the perpendicular type magnetic recording members having magnetic films comprising various Co—Ni—O compositions are prepared by varying the amount of $O_2$ gas introduced to provide various $O_2$ partial pressures in the chamber 1 or by varying the mixing ratio of Co to Ni to be evaporated.

Figure 4:
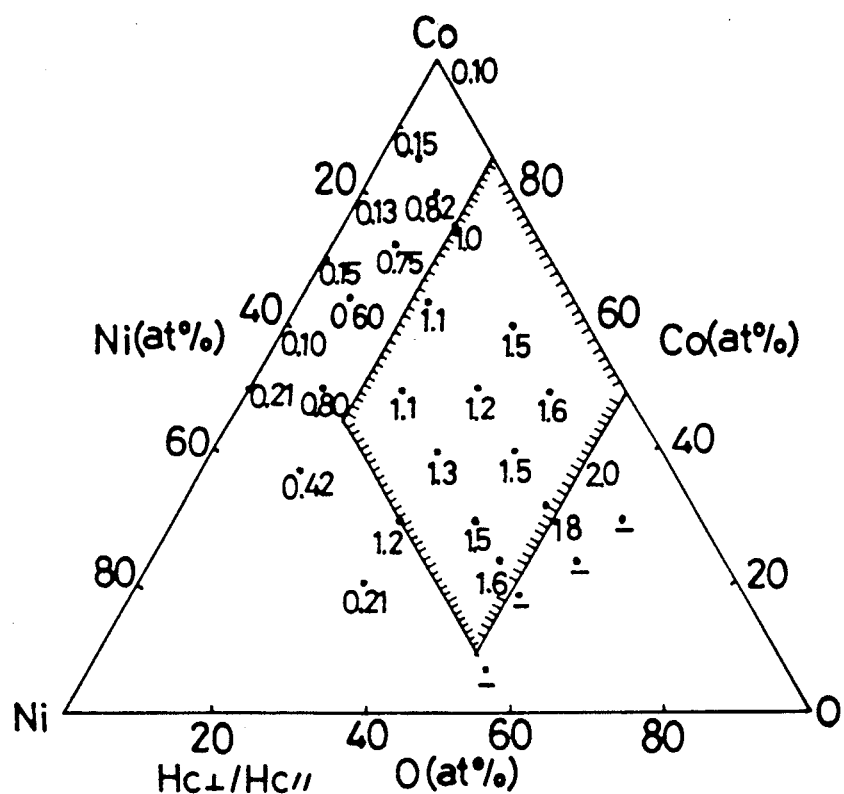
FIGS. 4–6 are diagrams showing the relationship between various Co—Ni—O compositions and the magnetic properties thereof.
Figure 5:
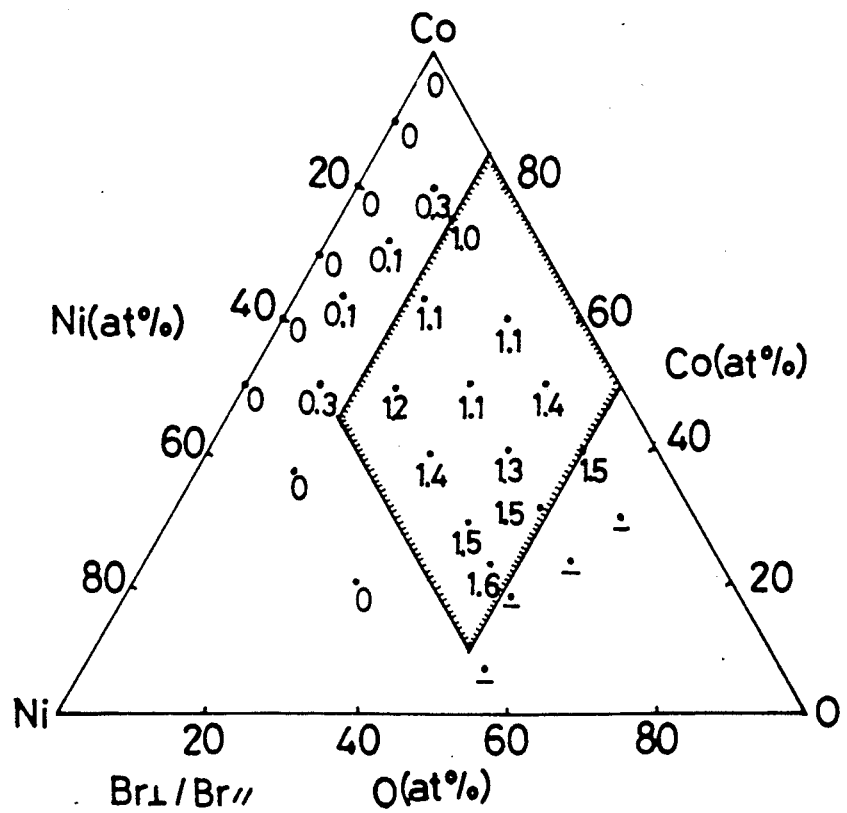
Figure 6:
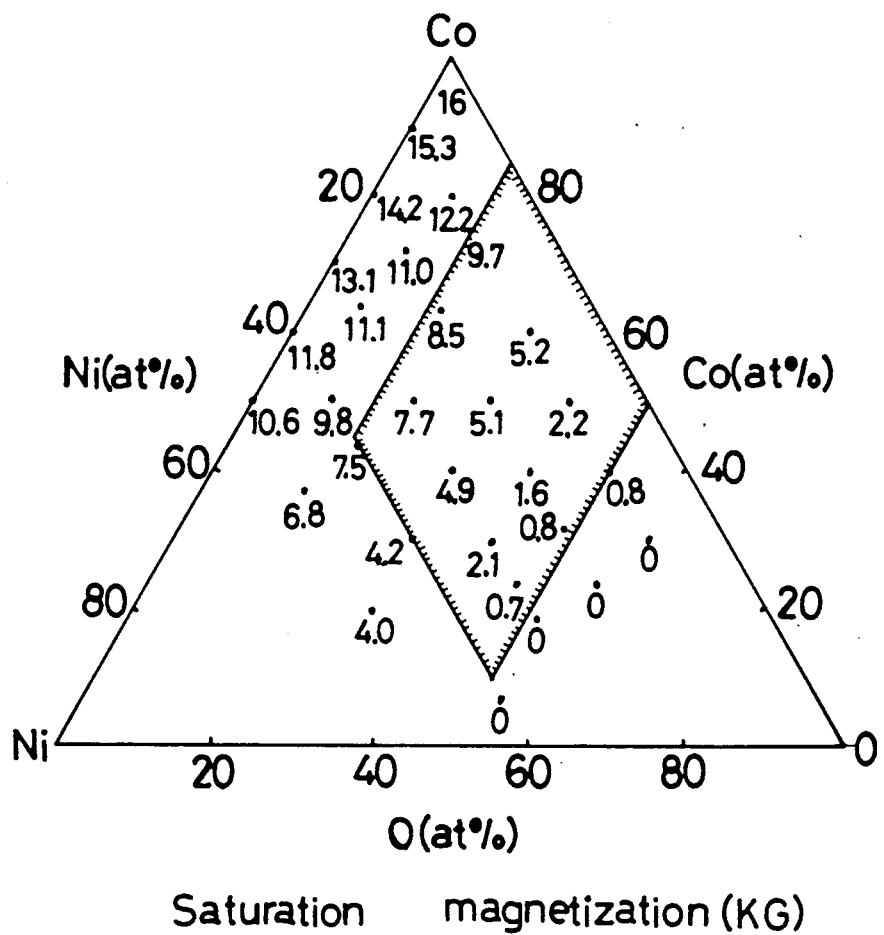
Figure 7:
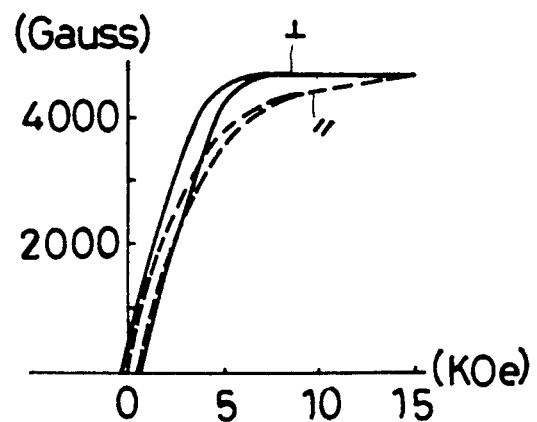
FIG. 7 is a diagram showing the characteristic curves of a hysteresis loop of another example of this invention magnetic film.

Also, by varying the running speed of the tape substrate a and/or varying the evaporation rate of Ni—Co, manufactured magnetic recording members having the magnetic films varied in thickness in the range of 1000 Å–10000 Å can be manufactured. The relationship between magnetic films having different composition ratios of the Co—Ni—O, and their magnetic properties have been examined. The results obtained are shown in FIG. 4, FIG. 5 and FIG. 6. As shown in FIG. 4, as the O component is increased, $Hc\perp/Hc\parallel$ is increased and more than 15 atom % of O component makes the $Hc\perp/Hc\parallel$ ratio more than 1. With respect to a residual magnetic flux density $Br\perp/Br\parallel$, FIG. 5 shows that as the O component is increased, the same is increased, and more than 15 atom % of the O component makes the same more than 1. However, as shown in FIG. 6, saturation magnetization becomes zero when the O compoonent is above 50 atom %. From the above results, it is apparent that the area surrounded by the oblique lines in these Figures, that is, in the composition range of $(Co_{1-z}Ni_z)_{1-m}O_m$ where $0 < z < 0.40$, $0.15 < m < 0.50$, will provide excellent perpendicular magnetic films in the present invention. FIG. 7 shows hysteresis loops of a typical perpendicular magnetic film comprising $(Co_{0.9}Ni_{0.1})_{0.7}O_{0.3}$ of this invention, and it is clear therefrom that the film is a sufficient perpendicular magnetic film. Thus, when the O component is in the range of 15–50 at %, and Ni component ratio of Co and Ni is $0 < Ni < 40$ at %, satisfactory perpendicular magnetic films can be obtained. Beyond 40 at % of Ni content, the crystalline structure of the deposited metal grains becomes an f c c structure, which is greatly decreased in magneto crystalline anisotropy, so that a perpendicular magnetic film cannot be produced.

In addition, this perpendicular magnetic film of the present invention which includes the Ni material has an improved corrosion resistance. The perpendicular coercive force of this magnetic film is about 400–1000 Oe which are the best values for a perpendicular type magnetic recording member.

In manufacturing the above magnetic film within the above Co—Ni—O composition range, if the Co—Ni evaporation speed is changed, generally the $O_2$ amount of gas introduced is also changed.

Since the perpendicular incident deposition frequencies of the Co stoms and the Ni atoms and those of the O atoms on the substrate are almost proportional to one another, when the Co—Ni evaporation rate is increased, it is necessary to increase the partial pressure of $O_2$ by increasing the amount of the $O_2$ gas introduced.

In this embodiment example of this invention, the substrate is cooled by the can 2, but it is not always necessary to cool the same. Good results also can be obtained when the substrate is not heated. When the substrate is not heated, no curling results and a good product is obtained.

Thus, in this example, an inexpensive material can also be used as the substrate.

Also, according to this invention, the vapor pressure of Co and that of Ni are almost equal, and therefore, even if the Co—Ni alloy of any predetermined component ratio is evaporated from a single common evaporation source 3, a desired predetermined composition of Co—Ni evaporation deposition can be obtained on the substrate. Consequently, in this case, if the $O_2$ introduction amount is kept constant, a predetermined uniform Co—Ni—O composition magnetic film can be produced over a long period of time in a continuous manufacturing operation.

The foregoing intermediate magnetic film, as mentioned in the first example, may also be interposed between the substrate and the perpendicular magnetic film of Co—Ni—O composition in this second example.

Next, a third example of this invention will be explained with reference to FIGS. 8-14, as follows;

The third example is directed to a perpendicular type magnetic recording member having a perpendicular magnetic film comprising a Fe—Co—Ni—O composition.

The Fe—Co—Ni—O composition is $(Fe_xCo_yNi_z)_{1-m}O_m$ where $0 \leq x \leq 0.05$, $0 \leq z \leq 0.40$, $x+y+z=1$, $0.15 \leq m \leq 0.50$ or which is the region forming a hcp structure, or $(Fe_xCo_yNi_z)_{1-m}O_m$ where $0.40 \leq x \leq 1.0$, $0 \leq z \leq 0.25$, $x+y+z=1$, $0.25 \leq m \leq 0.50$, which is the region forming a bcc structure.

A manufacturing method of the above magnetic recording members is carried out by using the foregoing apparatus 1 in almost the same manner as in the above two examples.

The perpendicular incident deposition magnetic film thus obtained comprises a phase of a perpendicularly grown columnar ferro-magnetic grains of Fe—Co—Ni and a phase of a non-magnetic oxides thereof surrounding the columnar grains.

Figure 8:
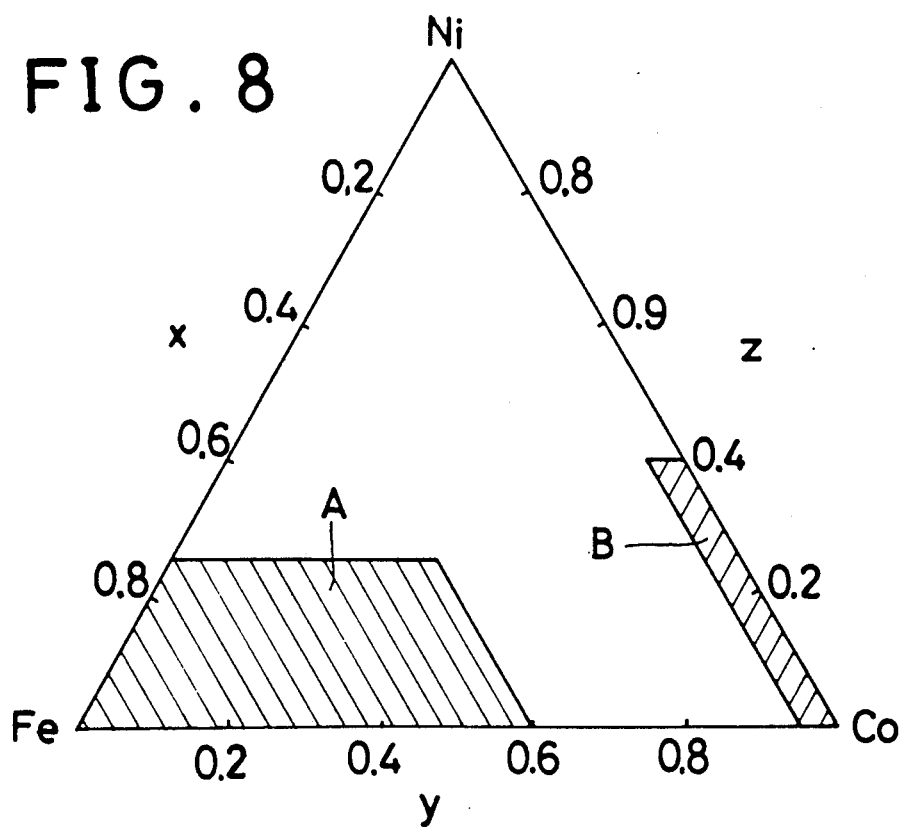
FIG. 8 is a diagram showing composition ratios of three metal components applicable to the perpendicular magnetic films of this invention.

A number of magnetic recording members having the Fe—Co—Ni—O composition system were prepared in which the composition ratios of the four elements are varied, and magnetic properties thereof were measured. The results are shown in FIG. 8. FIG. 8 illustrates that by partially oxidizing the composition ratios of Fe—Co—Ni in the two regions A and B surrounded respectively by the oblique lines, there can be obtained excellent perpendicular magnetic films. The A region is one forming a bcc structure, and the B region is one forming a hcp structure. As mentioned above, it is necessary, when making a perpendicular magnetic film, that the perpendicular magnetic anisotrpic energy Ku is larger than the diamagnetic field energy $2 \pi Ms^2$ in the direction perpendicular to the phase of the film. In this case, as the perpendicular magnetic anisotropy, a magneto crystalline one and a shape one can be considered. It has been found that the perpendicular magnetic film of this invention has such a structure that the ferro-magnetic column grain phase of Fe—Co—Ni grown perpendicularly is surrounded by a non-magnetic phase of oxides of Fe—Co—Ni, and also the column grain is long in that the diameter of its short axis is about 200-1000 Å and the diameter of its long axis is about 1000 Å-1 $\mu$m, which illustrates this magnetic film of the present invention also has a large shape anisotropy. In addition, by X-ray diffraction, it has been found that in the B region the c axis of the hcp structure is oriented in the perpendicular direction, and also in the A region, the (100) direction of the bcc structure is oriented in the perpendicular direction, and both the axial directions are in the easy crystal magnetization directions, so that this magnetic film has the magneto crystalline anisotropy.

Thus, the role of the oxygen introduction is to separate the perpendicular columnar grains from each other by the non-magnetic oxides and to decrease the saturation magnetization of the entire magnetic film for satisfying the condition of $K \perp \geq 2 \pi Ms^2$.

As the amount of oxygen gas introduced is increased, while the evaporation rate of Fe, Co, Ni is kept constant, the concentration of oxygen in the film is increased. At the same time, the size of the columnar grain is decreased and the separation thereof from the oxide is developed, so that the decrease in the saturation magnetization and the anisotropic field in the perpendicular direction are increased. As a result of many experiments, it has been found that the perpendicular magnetic film is obtained when the oxygen component is more than 25 at % in the A region and more than 15 at % in the B region; the effective perpendicular magnetic films can be obtained in the range of 15-50 at % in oxygen content in the A region and, the most effective films being in the range of 35-45 at % O; and in the B region, effective films can be obtained in the range of 15-50 at % in $O_2$ content, the most effective films being in the range of 25-45 at % O. Namely, if the O content is beyond 50 at %, it causes the saturation magnetization to become zero. This is considered to result from the fact that the oxides are FeO, CoO, NiO or the mixed crystallines thereof in the automatic ratio of 1:1.

The $Hc\perp$ of the perpendicular magnetic films, obtained by the foregoing two A, B regions added therein with the oxygen contents of the foregoing predetermined range, is about 400-1000 Oe, which are the best values for perpendicular magnetic recording members. Those values are obtained by using the apparatus as shown in FIG. 1 and in almost the same manner as in the foregoing examples, even when the substrate is not heated at a normal temperature, or in a case where it is cooled. The reason why good perpendicular magnetic properties can be obtained even when the substrate is not heated is considered to be due to the fact that the O atoms are easily diffused in or spread over the film surface.

The conventional Co—Cr system perpendicular magnetic film is obtained with such a structure that Cr atoms are segregated around the crystal boundaries of the Co columnar grains to form non-magnetic phases separating the columnar grains from each other. For forming this structure, it is necessary to diffuse Cr atoms over the film surface. This can be achieved by raising the temperature of the substrate and cannot be achieved when the substrate is not heated or heated to a low temperature. Whereas, according to this invention, oxygen gas is introduced and easily diffused over the film surface, and even when the substrate is not heated, a good perpendicular magnetic film can be obtained. A manufacturing method of the above products is almost the same as the above two embodying examples.

Further, the advantages from the manufacturing method are substantially the same as those in the above two embodying examples. Namely, there can be obtained a uniform magnetic film for a long period of time in the manufacturing operation, and no curling or warping of the product results.

By using the foregoing apparatus shown in FIG. 1, almost in the same manner as in the two above examples, there were produced various perpendicular type magnetic recording members having perpendicular magnetic films with thicknesses in the range of 1000 Å–10000 Å. The magnetic properties of these magnetic members and alloy compositions thereof were measured.

Figure 9:
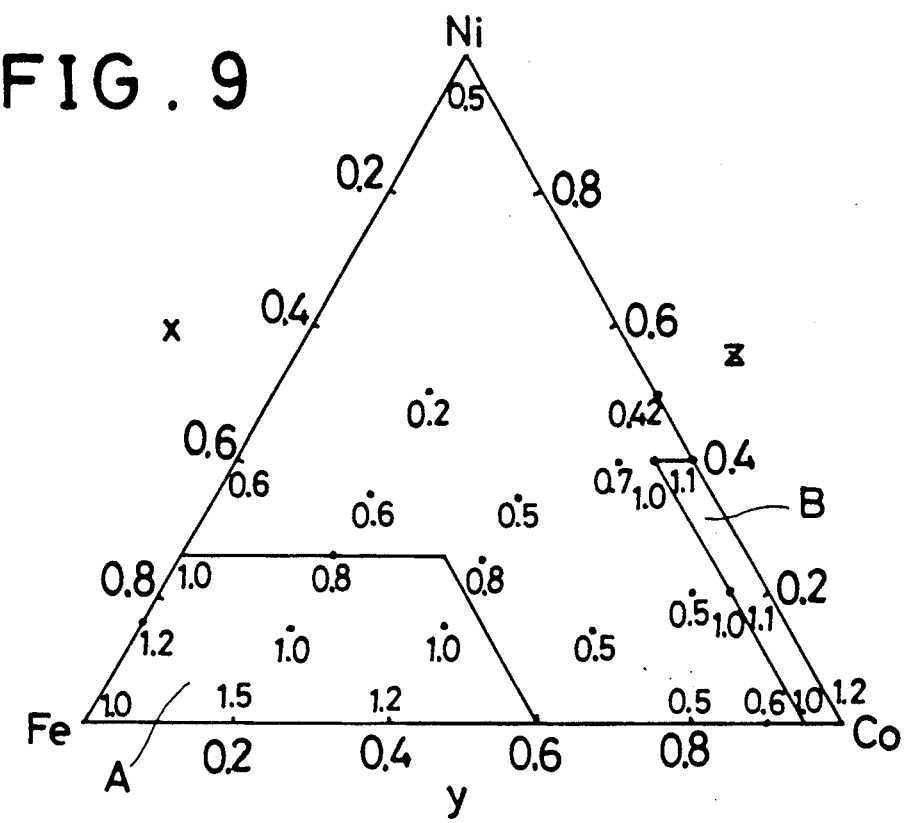
FIGS. 9–14 are diagrams showing the relationship between various composition ratios of the three metal components containing various contents of O atoms.
Figure 10:
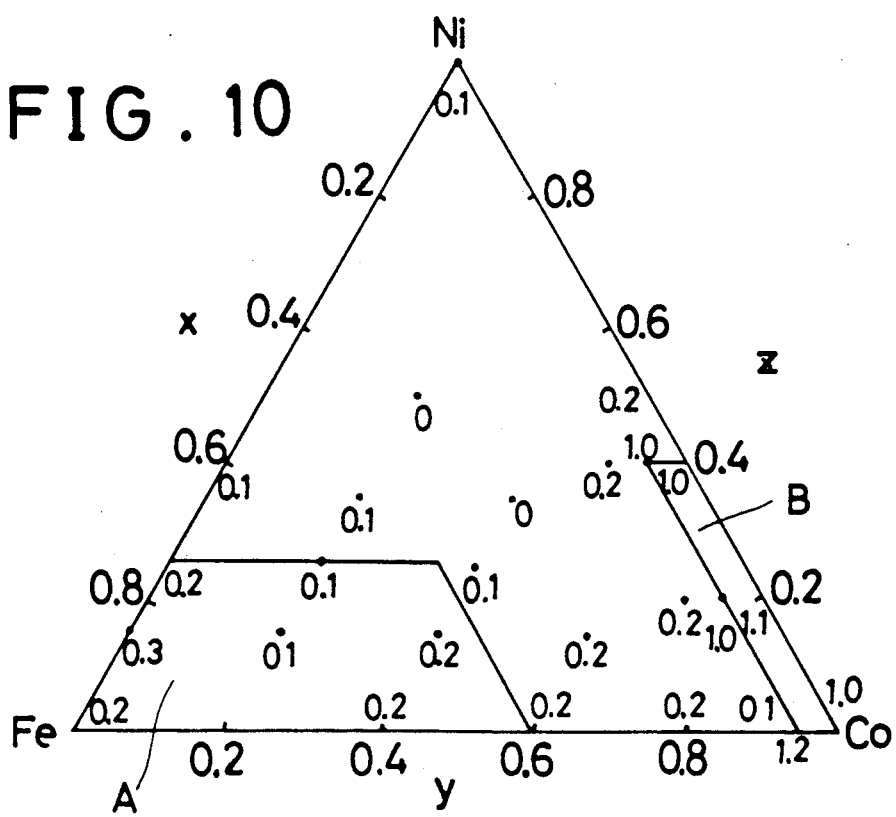
Figure 11:
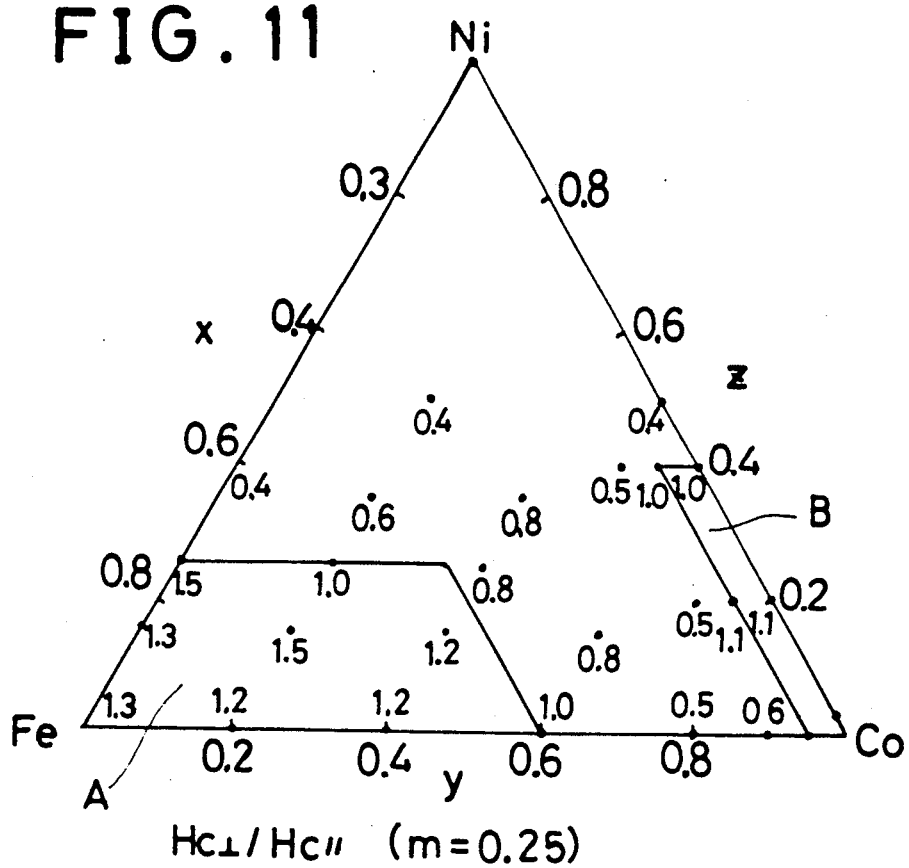
Figure 12:
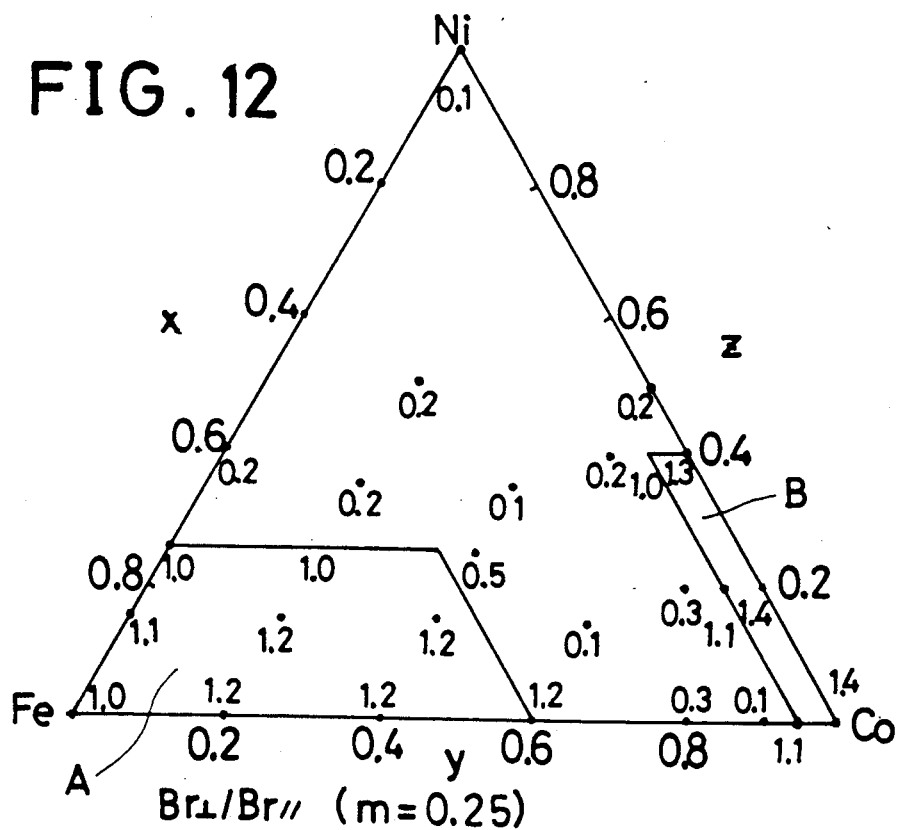
Figure 13:
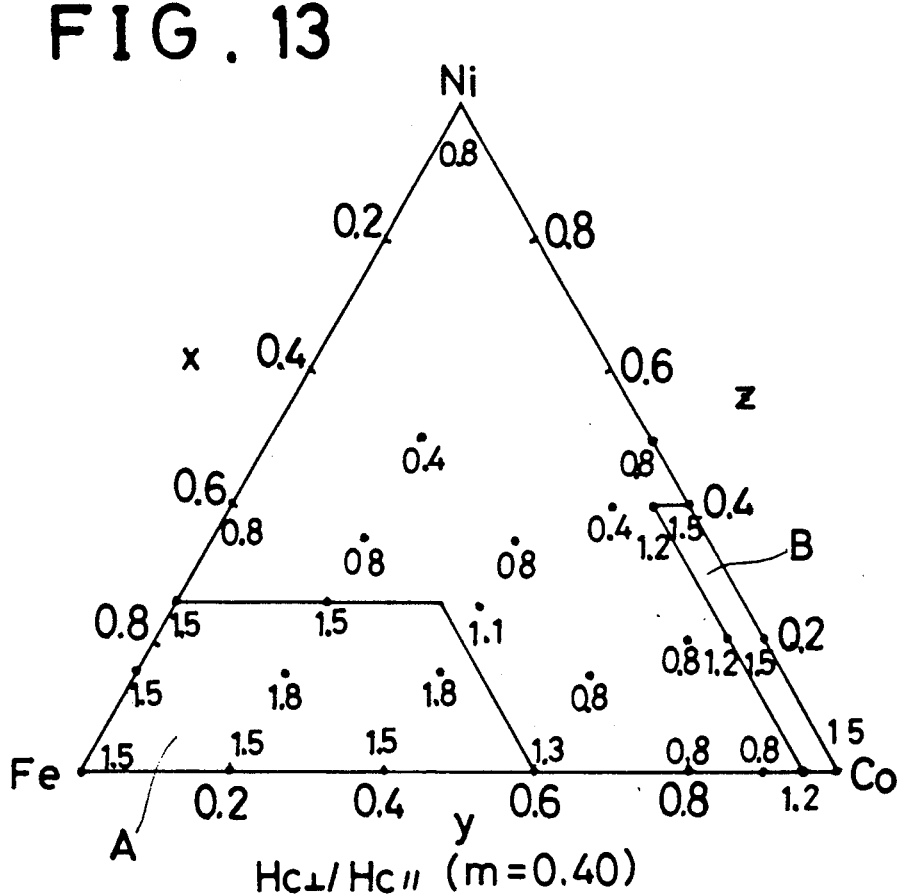
Figure 14:
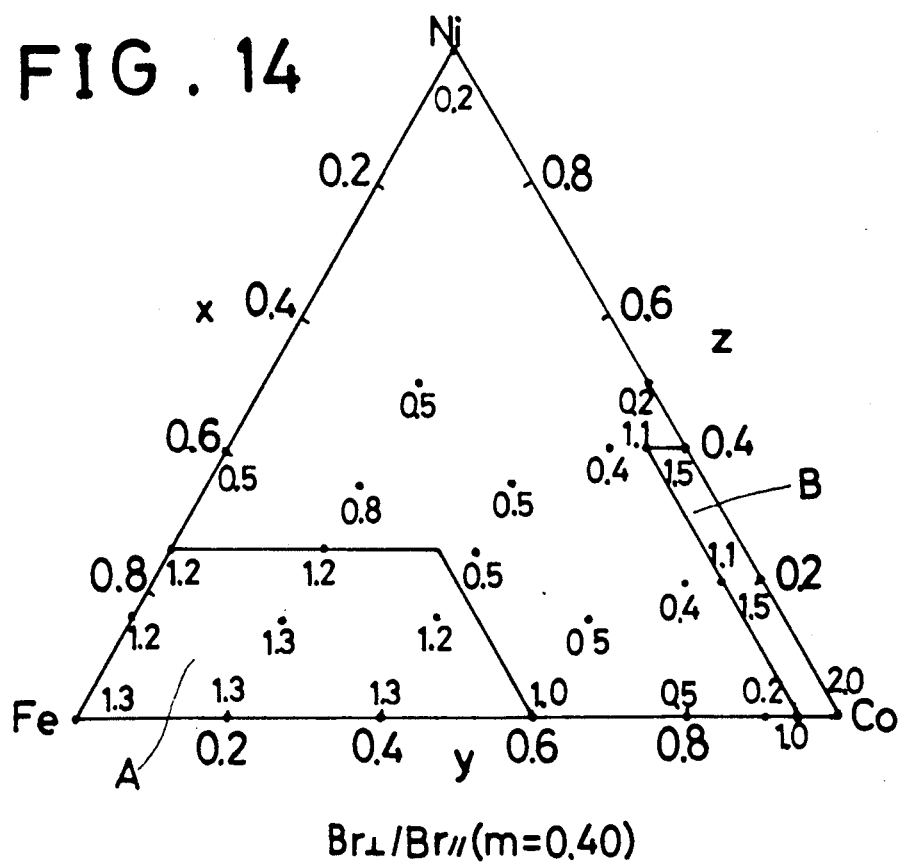

FIGS. 9 and 10 show the resultant values of Hc⊥/Hc∥ and Br⊥/Br∥ when the $O_2$ component is kept constant 15 at % while the Fe—Co—Ni composition is varied in ratio thereof. As apparent therefrom, in the B region both Hc⊥/Hc∥ and Br⊥/Br∥ are more than 1. In the A region, Hc⊥/Hc∥ is more than 1, but Br⊥/Br∥ is less than 1. Thus, these A and B regions indicate that a predetermined perpendicular magnetic film cannot be produced when the $O_2$ content is 15 at %. It has also been found that in the fcc phase region outside the A and B regions, Hc⊥/Hc∥ and Br⊥/Br∥ are both less than 1, so that no perpendicular magnetic films can be produced in the fcc phase structure. Similarly, FIGS. 11 and 12 show a case including a constant content of 25 at % O, and indicate that there are produced perpendicular-incidence magnetic films in the A and B regions. FIGS. 13 and 14 show a case including a constant content of 40 at % O and indicate that there are produced perpendicular magnetic films in the A and B regions.

Also, in the third example, there may be manufactured perpendicular magnetic recording members having the above-described intermediate soft magnetic film interposed between the substrate and the perpendicular ferromagnetic film.

Furthermore, in the present invention, a manufacturing method is provided for manufacturing a further improved perpendicular type magnetic recording member, which is characterized in that a magnetic metal (Me) in a vacuum treatment chamber is vaporized while $O_2$ gas is introduced into the chamber for oxidizing part of vapors of the magnetic metal (Me). The vapors thereof are deposited on a substrate at a substantially perpendicular incident thereto; and, in the course of the perpendicular incident deposition of the vapors of the magnetic metal, part of the vapors is ionized, and thus a perpendicular deposition magnetic film comprising a predetermined composition of Me and O atoms is formed on the substrate.

By this method of the present invention, the crystallization of ferro-magnetic columnar grains is improved and magneto crystalline anisotropy is increased. In addition, lattice defects in the columnar grains or sub-grains can be eliminated and orderly oriented columnar grains can be obtained, so that shape anisotropy thereof is improved.

Figure 15:
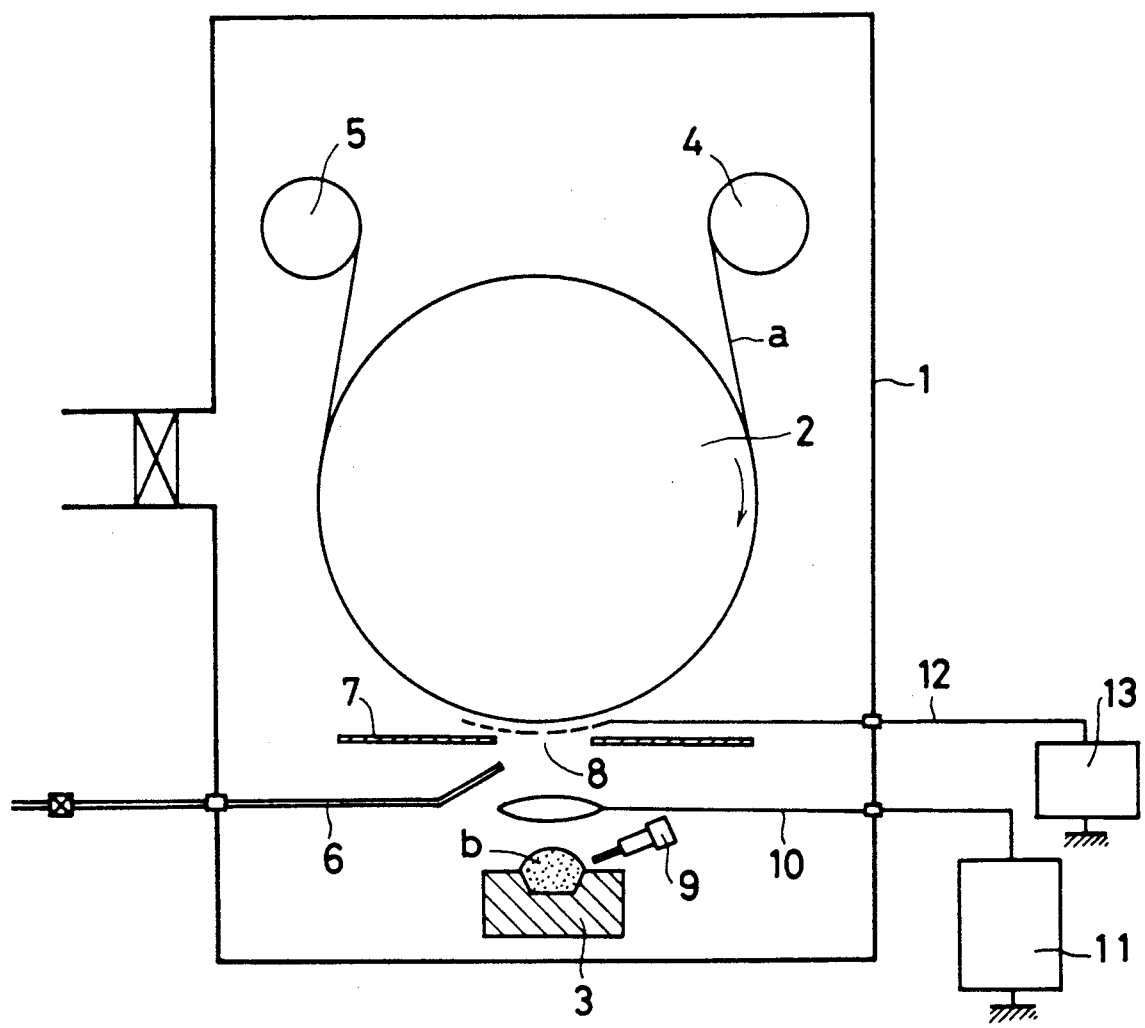
FIG. 15 is a side view of another apparatus for manufacture of magnetic recording members according to additional methods of this invention.

In another aspect of this invention, the ionized vapors are accelerated to increased speed by an electric field of d.c. or a.c. power. Embodying examples of this aspect of the invention will be explained with reference to FIGS. 15–19. FIG. 15 shows an apparatus for carrying out the above manufacturing methods. This apparatus is different from the apparatus shown in FIG. 1, in that it is provided with additional mechanisms.

Namely, in FIG. 15, the apparatus 1 is provided with an ionizing means. The ionizing means comprises an electrode 10 provided in a space located above the evaporation source 3 and a d.c. power source or a RF source 11 is connected to the electrode 10. The electrode 10 comprises an anode which is provided in connection with a positive d.c. current or a RF voltage for ionizing part of the metal vapors and oxygen at a high efficiency. In addition, the apparatus is provided with an acceleration means comprising a mesh-shaped electrode for acceleration which is located near the substrate portion running on the lower end surface of the can 2, and a d.c. or a.c. source 13 is connected thereto.

By using this apparatus, a perpendicular type magnetic recording member can be manufactured as follows. Namely, the chamber 1 is evacuated to below $1 \times 10^{-5}$ Torr, and a predetermined composition of metal (Me) b is evaporated by being heated with electron beam heating means 9, while oxygen is introduced into the chamber 1 through the oxygen introduction pipe 6. The evaporating rate can be 200 Å/sec. and the partial pressure of $O_2$ gas can be $1 \times 10^{-4}$ Torr. Under these conditions, a positive d.c. voltage is applied to the anode 10 connecting to the d.c. power source 11. Whereupon, electrons from the electron beam and a secondary electrons from the evaporating liquid surface of the metal (Me) are attracted to the positive electric field, whereupon the metal vapors and oxygen atoms collide with these electrons in the electric field space and are ionized, Namely, a comparatively greater part of the ionized metal vapors can be ionized, because while these electrons are being attracted to the positive electric field by the positive voltage application to the anode 10, the metal vapors are brought into contact with such attracted electrons. In this way, a greater part of the oxygen atoms also can be ionized.

The ionization of the metal vapors and oxygen atoms can be carried out by the application of the positive electrode voltage by using the RF electron voltage instead of direct current. When using RF voltage, the RF source also serves as an electron generating source, so that it becomes unnecessary to use the electron beam means as the heating means 9, and the non-electron beam type heating means such as an ordinary electric heater or the like can be used in place of the electron beam type heating means.

Thus, when the vapors of magnetic metal have been partially ionized together with the oxygen gas and pass through the space 8 between the plates 7, 7, they are deposited onto the lower surface of the tape substrate a running beneath the lower surface of the can 2, at a generally perpendicular incidence on the surface of the substrate, so that there is formed a partially ionized and oxidized perpendicular magnetic film.

Figure 16:
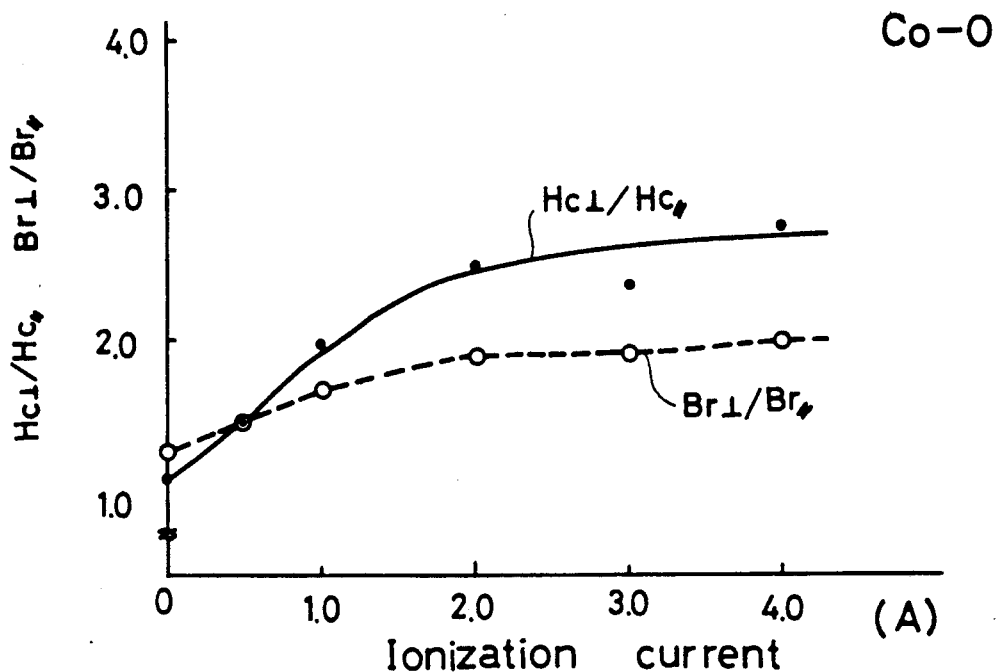
FIGS. 16–19 are diagrams showing the relationship between various manufacturing methods and the magnetic properties of magnetic films manufactured by using the apparatus of FIG. 15.

In the above method of this invention, Co metal may be used as the ferro-magnetic metal (Me), and the evaporating rate and the $O_2$ gas partial pressure are set at 200 Å/sec. and $1 \times 10^{-4}$ Torr, respectively. However, the ionizing electric current for applying a positive voltage to the anode 10 is varied, so that there are manufactured perpendicular type magnetic recording tape members having various perpendicular magnetic films of a Co—O system. In these products, there is a relationship between the change in the ionizing electric voltage and magnetic properties of the products. For comparison, various perpendicular type magnetic recording tape members having various perpendicular magnetic films of a Co—O system were manufactured by the above method, without a d.c. current applied to the anode 10. The resulting magnetic properties thereof were examined. The results are shown in FIG. 16. As is clear therefrom, the values of Hc⊥/Hc∥ and Br⊥/Br∥ are the lowest in regard to the magnetic films manufactured without application of the positive electric voltage to the anode 10; and accordingly, as the voltage applied thereto is increased, these values are increased. In this case, it has been found that these values become almost constant at the ionizing electric current of about 3 A or more.

According to the additional manufacturing method, the previously positive-charged metallic vapors are subjected to an acceleration negative voltage through the mesh-shaped electrode 12 which is connected to the d.c. source 13. This results in the vapors being accelerated to increased speed, and consequently, the reaction between the accelerated metal atoms and oxygen atoms, as well as the surficial diffusion of the metallic atoms, is increased. Thereby, there can be provided on the substrate, a perpendicular magnetic film which is higher, in the foregoing magnetic properties of $Hc\perp/Hc\parallel$ and $Br\perp/Br\parallel$, than the foregoing perpendicular magnetic films formed without the acceleration means.

Further, if an a.c. power is used instead of the d.c. power, a positive electric voltage and a negative one may be applied alternately to the electrode 12. Each time the negative voltage is applied, the ionized metallic vapors are accelerated thereby, and in addition, each time the positive voltage is applied, the negative-charged O atoms are accelerated, so that a uniform reaction between the metallic vapors and the oxygen atoms, as well as the diffusion thereof, can be improved when compared to the use of d.c. power.

Figure 17:
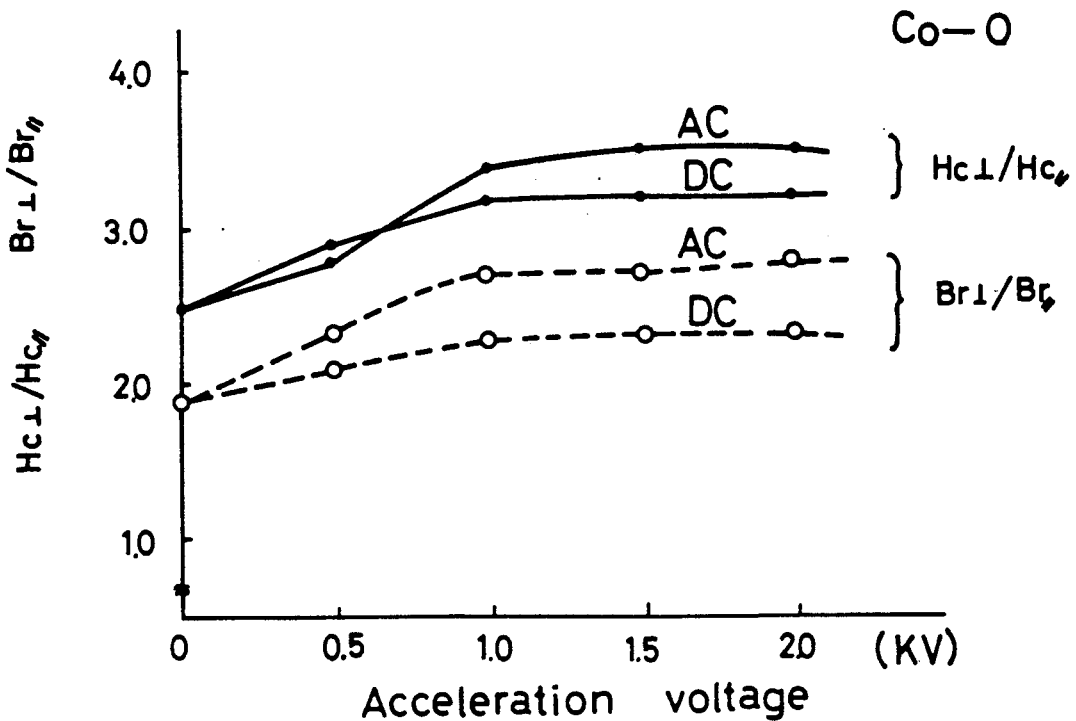

Various perpendicular type recording members having various perpendicular magnetic films of Co—O system were manufactured by setting the ionizing electric current to 2.0 Å and the acceleration voltage applied to the acceleration electrode 14 from the d.c. or a.c. powder was varied. The relationship between the acceleration electric voltage and the magnetic properties of the resulting films was examined. The results thereof are shown in FIG. 17. As is clear from FIG. 16, and FIG. 17, the values of $Hc\perp/Hc\parallel$ and those of $Br\perp/Br\parallel$ of the a.c. and d.c. powers is improved if the acceleration voltage is used when compared to not using the acceleration voltage. Also, as the acceleration electric voltage is increased, the respective properties are also increased. Further, if the substrate is made of an electric insulating material such as polyethylene terephthalate (PET) or the like, the use of the a.c. power is preferable.

Figure 18:
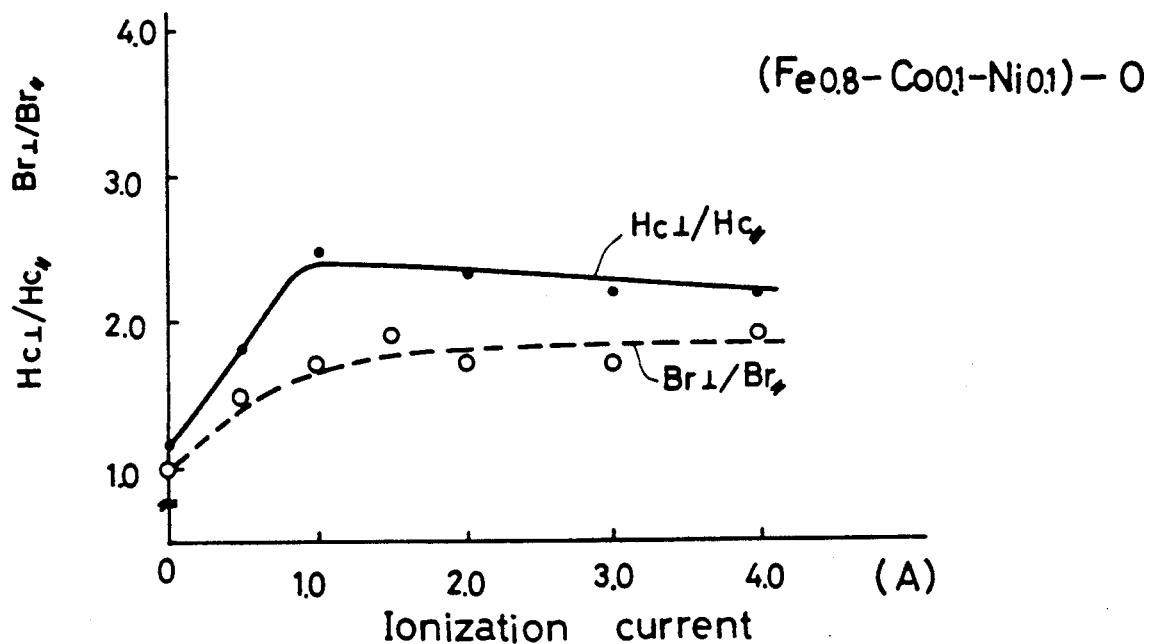
Figure 19:
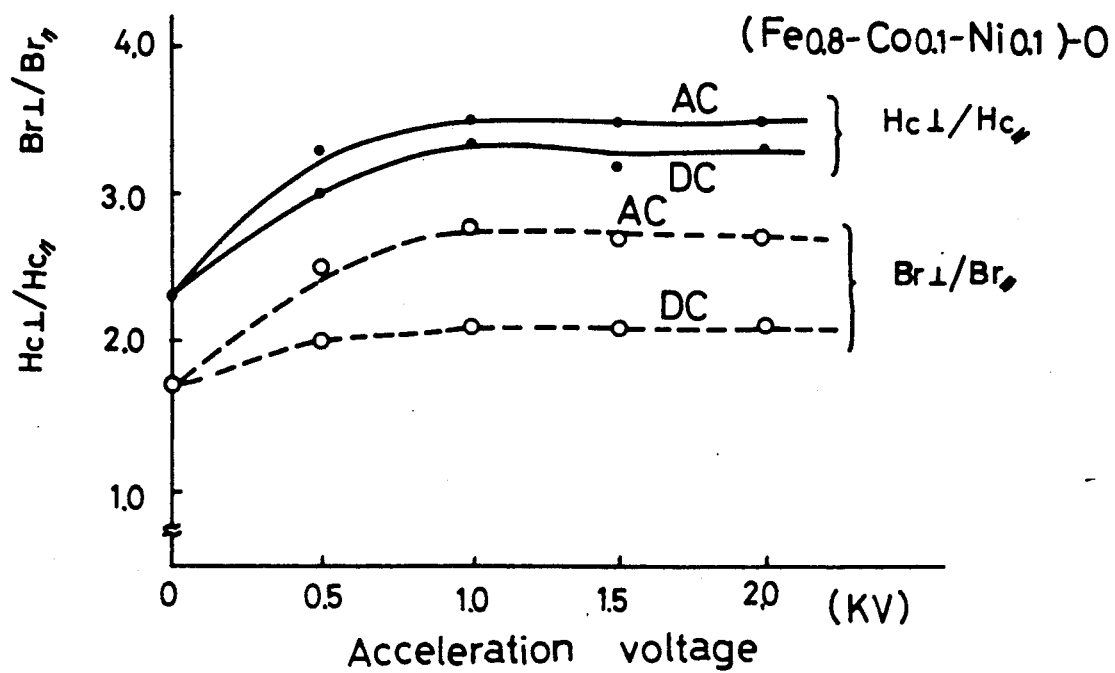

FIGS. 18 and 19 show the results of examining the relationship of the ionizing current and the acceleration voltage in conjunction with magnetic properties of perpendicular magnetic films of Fe—Co—Ni—O composition manufactured by the above method of this invention using the apparatus shown in FIG. 15. This examination used a Fe-10% Co-10% Ni alloy as the evaporating material metal b. From FIGS. 18 and 19, it is understood that, in a similar manner to the above example case of a Co—O composition film, the ionization and acceleration effects can be recognized.

As a result of many experiments and examinations, it has been found that perpendicular magnetic films of $Me_{1-m}O_m$, improved in those properties according to this invention method, can be obtained in such a metal and oxygen composition range as follows: $(Fe_xCo_yNi_z)_{1-m}O_m$ where $0 \leq x \leq 0.05$, $0 \leq z \leq 0.40$, $x+y+z=1$, and $0.15 \leq m \leq 0.50$ or $(Fe_xCo_yNi_z)_{1-m}O_m$ where $0.40 \leq x \leq 1.0$, $0 \leq z \leq 0.25$, $x+y+z=1$, and $0.25 \leq m \leq 0.50$.

In the foregoing embodying examples, the perpendicular magnetic film may have the soft magnetic material film between the substrate and the magnetic film.

According to another manufacturing method of this invention, the perpendicular type magnetic recording members having the perpendicular magnetic film comprising the Me—O composition can be manufactured by a sputtering process. This method is characterized in that a target comprising a magnetic metal (Me) in a vacuum treatment chamber is sputtered while $O_2$ gas is introduced thereinto; and the sputtered magnetic metal particles are deposited on a surface of a substance at substantially perpendicular angle thereto, while part of atoms of the innumerable sputtered particles of magnetic metal (Me) is oxidized, so that a perpendicular-incidence magnetic film having a predetermined composition of magnetic metal (Me—O) atoms is formed on the substrate.

Thus, there can be obtained a perpendicular type magnetic recording member which is improved in the $Hc\perp/Hc\parallel$ property and the $Br\perp/Br\parallel$ property.

In order to further improve the magnetic properties of the film resulting from the above manufacturing method, an additional manufacturing method is provided. This method is characterized in that a target of the magnetic metal (Me) and an electrode comprising the substrate itself or one near the substrate are provided in the vacuum treatment chamber. This method is carried out by applying a negative electric voltage or an alternate voltage to the electrode and by sputtering the target, while $O_2$ gas is introduced into the chamber so that innumerable sputtered magnetic metal (Me) fine particles are deposited on the substrate at substantially perpendicular-incidence angle thereto. During this procedure, some atoms thereof are oxidized, so that there is formed on the substrate, a perpendicular magnetic film comprising a predetermined composition of magnetic metal (Me—O) atoms.

Figure 20:
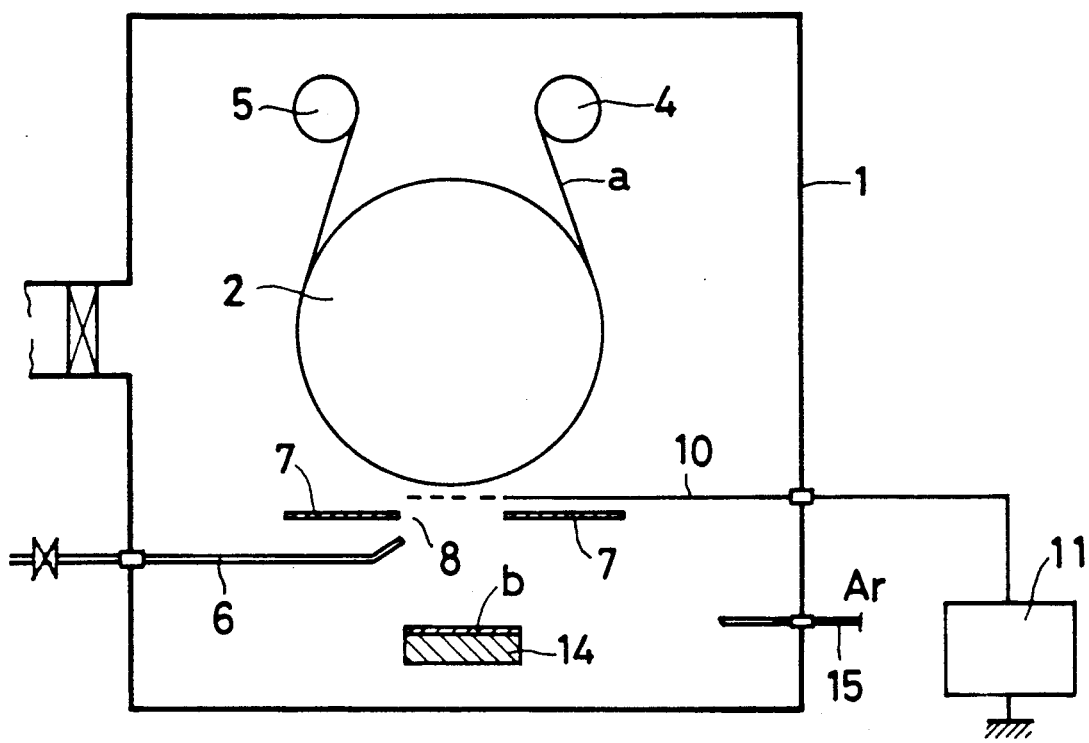
FIG. 20 is a side view of another apparatus for manufacture of magnetic recording members of the present invention by additional methods of this invention.

FIGS. 20–25 show embodying examples of the foregoing methods of this invention. Referring to FIG. 20, the apparatus 1 is one for carrying out those manufacturing methods of this invention. The apparatus is almost the same as that shown in FIG. 1 and FIG. 15, but is different therefrom in that instead of an evaporation method, a sputtering method is provided therein. Namely, just under the can 2, there is provided a sputtering cathode 14 on which the ferro-magnetic metal target b is provided, and preferably, the mesh-shaped acceleration electrode 10 connecting to the d.c. or a.c. power source 11 is located near the surface of the substrate a running on the lower end surface of the can 2. Numeral 15 denotes an introducing pipe for introducing a sputtering gas, such as Ar or the like into the chamber 1. For carrying out this invention, the apparatus can be operated as follows: The chamber 1 is evacuated to below $1 \times 10^{-5}$ Torr, and Ar gas is introduced into the chamber 1 through the introducing pipe 15, and the metal (Me) target b is sputtered under an Ar gas pressure of $5 \times 10^{-3}$ Torr. The sputtering is carried out by a d.c. magnetron sputtering process. Whereupon, a comparatively large amount of innumerable sputtered Me atoms, usually about 10% thereof, become ionized atoms. The energy generated at the time when the Me atoms are sputtered is comparatively high (about 10–100 eV) and can serve to produce the perpendicular magnetic films of the Me—O system which has improved perpendicular magnetic anisotropy.

On the other hand, $O_2$ gas is introduced at a constant flow rate into the chamber 1 from the oxygen supply pipe 6, and is brought into contact with the rising sputtered and partially-ionized metal (Me) atoms, so that part of the metal atoms is oxidized, whereby, mixed vapors of the metal atoms and the oxidized ones are deposited on the substrate running at a predetermined constant speed, through the interval or space opening 8, at a substantially perpendicular-incidence angle thereto, so that there is formed on the surface of the substrate a perpendicular magnetic film of a predetermined composition comprising two phases of the magnetic metal (Me) atoms and non-magnetic oxides thereof, and thus the perpendicular magnetic recording film is wound onto roller 5.

According to another method of this invention, during the operation of the above method, the negative voltage is applied to the acceleration electrode 10 from the d.c. power source 11, so that there is created a negative electric field therearound. This results in that the foregoing partially ionized sputtered positively-charged metal (Me) atoms are accelerated to increased speed by the electrode 10, by being drawn upwards into the negative electric field. When the power source 11 is a.c., the electrode 10 can be provided with an alternate application of positive and negative electric voltages; whereby, there is an acceleration of ionized Me atoms and an acceleration of partially ionized O atoms which improve results. Consequently, a reaction and a diffusion can be carried out effectively near the mesh-shaped electrode 10 between the sputtered metal Me atoms and the oxygen atoms, and accordingly, there can be formed a good perpendicular magnetic film of the composition of metal and O atoms comprising two phases of metal (Me) atoms and oxides thereof, which are uniformly diffused on the entire surface of the substrate a. If the substrate material is an electric insulating material, use of the a.c. voltage application is preferable in view of preventing the same from becoming electrically charged. When an electrically conductive substrate is used, the same can be arranged to be used as an acceleration electrode by being connected to the a.c. or d.c. power source (not illustrated).

Figure 21:
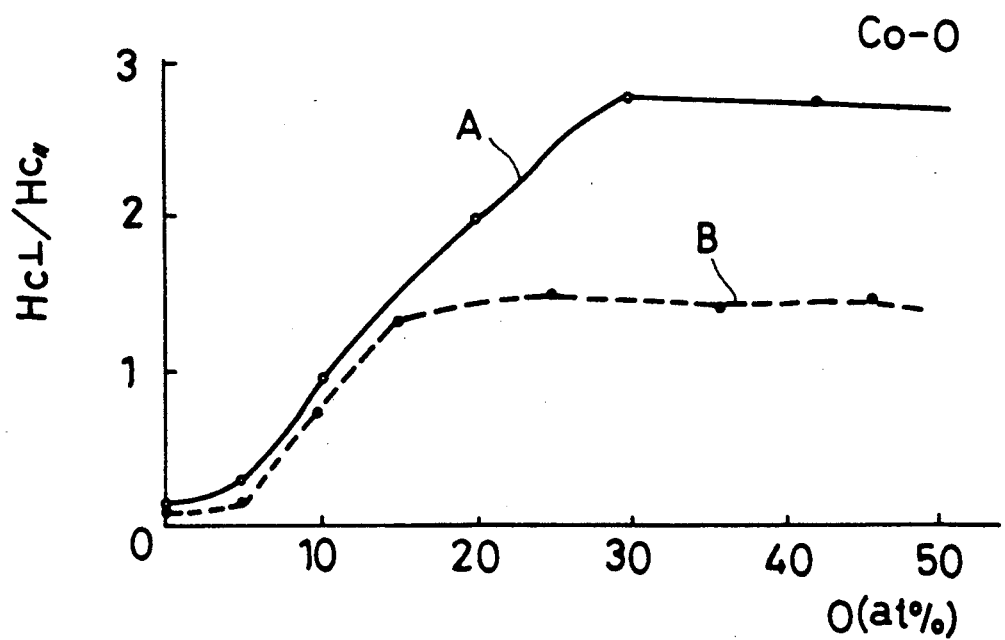
FIGS. 21–25 are diagrams showing the relationship between the various manufacturing methods using the apparatus of FIG. 20 and the magnetic properties of magnetic films manufactured thereby.
Figure 22:
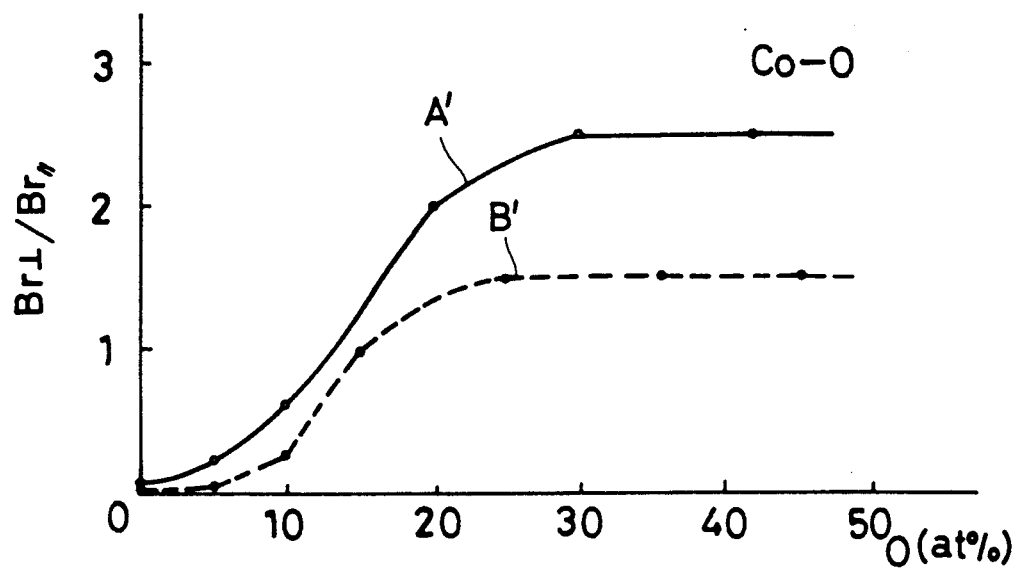

In FIGS. 21 and 22, curves A and A' respectively show perpendicular magnetic properties $Hc\perp/Hc\|$ and $Br\perp/Br\|$ of various perpendicular magnetic film prepared, according to this invention, by varying the composition ratio of oxygen to Co which is used as the target b. Also, in these Figures, curves B and B' respectively show magnetic properties of various perpendicular magnetic films of the same composition ratio of Co—O as prepared above in the first example, in which Co is evaporated by the electron beam heating means while $O_2$ is introduced into the chamber and the film is deposited on the substrate at substantially perpendicular angle. As is clear from these curves, the magnetic properties of the Co—O perpendicular incidence magnetic films prepared by the sputtering process are more excellent than those prepared by the evaporation process.

Figure 23:
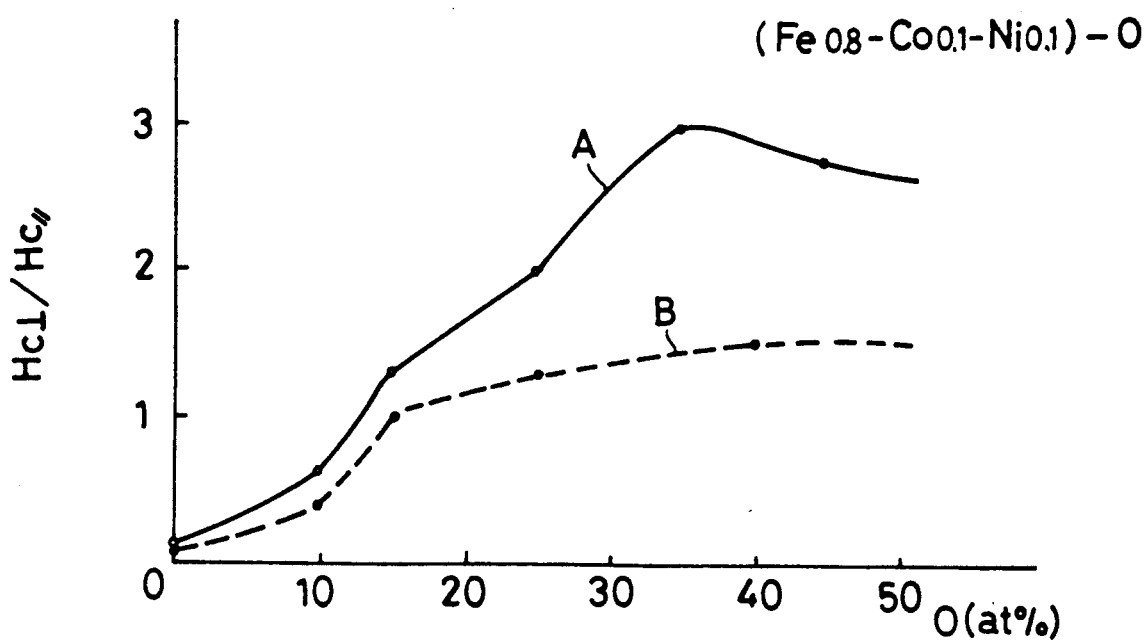
Figure 24:
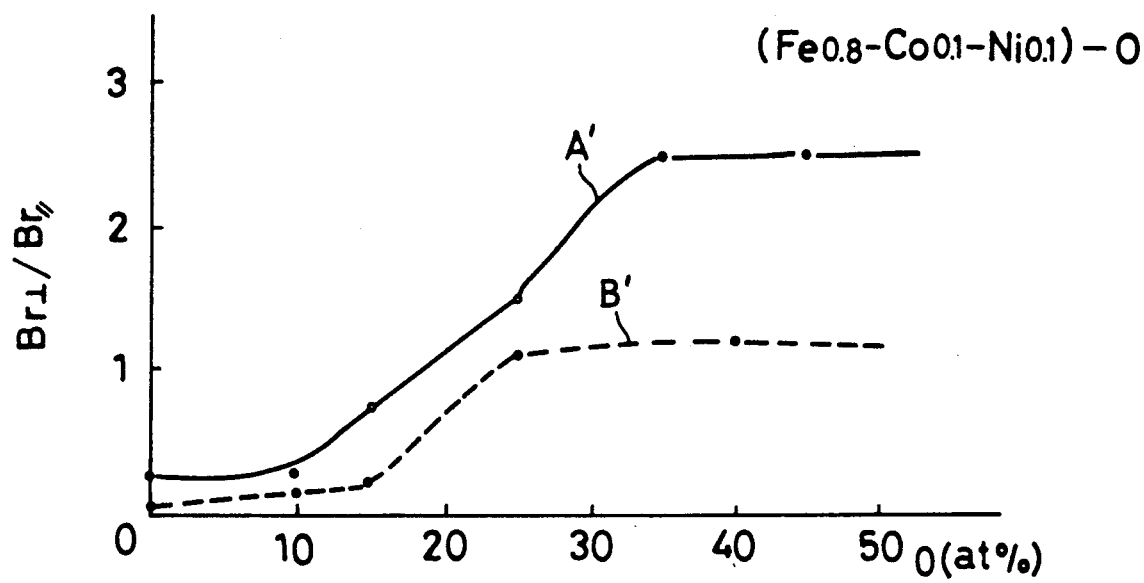

FIG. 23 and FIG. 24 respectively show perpendicular-magnetic properties A, A' of various perpendicular magnetic films of Fe—Co—Ni—O prepared by using a 10% Co-10% Ni-remainder Fe alloy ($Fe_{0.8}$—$Co_{0.1}$—$Ni_{0.1}$) as the target b, while the O constant is varied from 0 to 50 at %. These films were prepared by the sputtering process. These Figures also show the perpendicular magnetic properties B, B' of various perpendicular magnetic films of the same composition prepared, for comparison, by the foregoing proposed evaporation process of this invention. It is also understood from these curves that the perpendicular magnetic properties of the products prepared by the sputtering process of this invention are better than those of the products prepared by the evaporation process of this invention.

Figure 25:
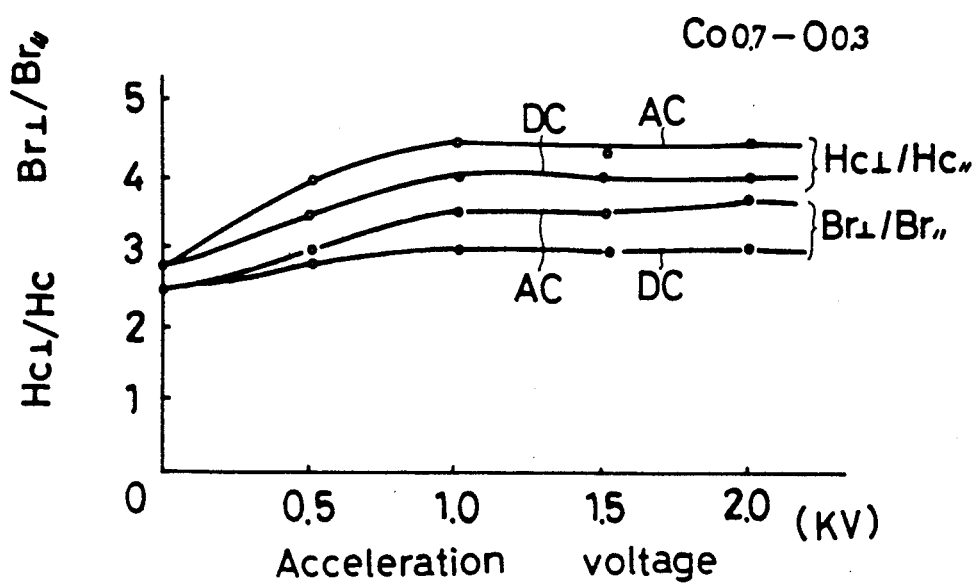

FIG. 25 shows curves of the magnetic properties of perpendicular-incidence magnetic films of a $Co_{0.7}$—$O_{0.3}$ composition respectively prepared by respectively applying acceleration voltages of the d.c. voltage and the a.c. voltage during deposition of the sputtered Co atoms on the substrate while $O_2$ gas is introduced.

As is apparent therefrom, the $Hc\perp/Hc\|$ and $Br\perp/Br\|$ can be improved by the use of the acceleration voltages, and the application of a.c. voltage provides increased improvement in these properties, when compared to the d.c. voltage.

The perpendicular magnetic films of the Me—O composition prepared by the sputtering process of this invention can be obtained with $(Fe_xCo_yNi_z)_{1-m}O_m$ where $0 \leq x \leq 0.05$, $0 \leq z \leq 0.40$, $x+y+z=1$, and $0.15 \leq m \leq 0.50$, or with $(Fe_xCo_yNi_z)_{1-m}O_m$ where $0.40 \leq x \leq 1.0$, $0 \leq z \leq 0.25$, $x+y+z=1$ and $0.25 \leq m \leq 0.50$. In order to obtain magnetic films within these compositions, the amount of oxygen introduced, sputtering process, and the running speed or velocity of the substrate are controlled. In general, the film thickness thereof prepared by the sputtered process of this invention is in the range of 1000–10000 Å. Before the substrate is subjected to the sputtering process of this invention, it may be coated with the soft magnetic material film of permalloy or the like, as described above.

Thus, according to this invention, a method of manufacturing a perpendicular magnetic recording member is provided, wherein a perpendicular magnetic film is deposited on a substrate from vapors of ferro-magnetic metal (Me) at a substantially perpendicular-incidence angle to the substrate, while an oxygen gas is introduced into the chamber. Thus, a perpendicular magnetic film of Me—O composition having improved magnetic properties can be uniformly and continuously obtained over a long period of time, without heating the substrate and without curling or warping of the substrate. In a preferable aspect of this invention film, the vapors of the ferro-magnetic metal are ionized or additionally accelerated to increased speed by application of the electric voltage, which further improves the magnetic properties such as $Hc\perp/Hc\|$ and $Br\perp/Br\|$ Further, if the composition ratio of Me and oxygen atoms of the magnetic film of this invention comprises $(Fe_xCo_yNi_z)_{1-m}O_m$ where $0 \leq x \leq 0.05$, $0 \leq z \leq 0.40$, $x+y+z=1$ where $0.15 \leq m \leq 0.50$ and/or $(Fe_xCo_yNi_z)_{1-m}O_m$ are in the region where $0.40 \leq x \leq 1.0$, $0 \leq z \leq 0.25, x+y+z=1$ and $0.25 \leq m \leq 0.50$, perpendicular type magnetic recording members which are excellent in magnetic properties can be obtained.

We claim:

1. A method for manufacturing a perpendicular-type magnetic recording member, comprising the steps of:
   providing a substrate for said magnetic recording member in an evacuated vacuum chamber;
   introducing oxygen gas into the vacuum chamber while simultaneously vaporizing in the vacuum chamber at least one magnetic metal selected from the group consisting of Fe, Co and Ni, thereby causing partial oxidation of the vapors of said magnetic metal and deposition of the partially oxidized metal vapors on the substrate, wherein the temperature of the substrate is approximately equal to room temperature during said deposition;
   controlling the proportion of said magnetic metal and controlling the oxygen pressure so as to obtain a perpendicular magnetic film having a composition represented by $(Fe_xCo_yNi_z)_{1-m}O_m$, wherein $0 < x \leq 0.05$, $0 \leq z \leq 0.40$, $x+y+z=1$, and $0.15 \leq m \leq 0.50$, whereby said obtained perpendicular magnetic film comprises magnetic particles of said magnetic metal and non-magnetic particles of oxide of said metal, and the obtained magnetic film has a magnetic anisotropy in the direction perpendicular to the plane of the film which satisfies the following conditions:

$Ku\perp > 2\pi Ms^2$, $Hc\perp > Hc\|$, and $Br\perp > Br\|$, wherein $Ku\perp$ is the crystal magnetic anisotropy energy in the direction perpendicular to the film surface, Ms is the saturation magnetization, $Hc\perp$ is the coercive force in the direction perpendicular to the film surface, $Hc\|$ is the coercive force in the direction parallel to the film surface, $Br\perp$ is the residual magnetic flux density in the direction perpendicular to the film surface, and $Br\|$ is the residual magnetic flux density in the direction parallel to the film surface.

2. A method as in claim 1, wherein the substrate is cooled to remain at a temperature approximately equal to room temperature during said deposition.

3. A method for manufacturing a perpendicular type magnetic recording member, comprising the steps of:
providing a substrate for said magnetic recording member in an evacuated vacuum chamber;
introducing oxygen gas into the vacuum chamber while simultaneously vaporizing in the vacuum chamber at least one magnetic metal selected from the group consisting of Fe, Co and Ni, thereby causing partial oxidation of the vapors of said magnetic metal and deposition of the partially oxidized metal vapors on the substrate, wherein the temperature of the substrate is approximately equal to room temperature during said deposition;
controlling the proportion of said magnetic metal and controlling the oxygen pressure so as to obtain a perpendicular magnetic film having a composition represented by $(Fe_xCo_yNi_z)_{1-m}O_m$, wherein $0.40 \leq x \leq 1.05$, $0 \leq z \leq 0.25$, $x+y+z=1$, and $0.25 \leq m \leq 0.50$, whereby said obtained perpendicular magnetic film comprises magnetic particles of said magnetic metal and nonmagnetic particles of oxide of said magnetic metal, and the obtained magnetic film has a magnetic anisotropy in the direction perpendicular to the plane of the film which satisfies the following conditions:

$Ku\perp > 2\pi Ms^2$, $Hc\perp > Hc\|$, and $Br\perp > Br\|$, wherein $Ku\perp$ is the crystal magnetic anisotropy energy in the direction perpendicular to the film surface, Ms is the saturation magnetization, $Hc\perp$ is the coercive force in the direction perpendicular to the film surface, $Hc\|$ is the coercive force in the direction parallel to the film surface, $Br\perp$ is the residual magnetic flux density in the direction perpendicular to the film surface, and $Br\|$ is the residual magnetic flux density in the direction parallel to the film surface.

4. A method as in claim 3, wherein the substrate is cooled to remain at a temperature approximately equal to room temperature during said deposition.

5. A method for manufacturing a perpendicular type magnetic recording member, comprising the steps of:
providing a substrate for said magnetic recording member in an evacuated vacuum chamber;
introducing oxygen gas into the vacuum chamber while simultaneously vaporizing in the vacuum chamber at least one magnetic metal, thereby causing partial oxidation of the vapors of said magnetic metal and deposition of the partially oxidized metal vapors on the substrate, wherein the temperature of the substrate is approximately equal to room temperature during said deposition;
controlling the proportion of said magnetic metal and controlling the oxygen pressure so as to obtain a perpendicular magnetic film having a predetermined composition, and
ionizing a portion of the partially oxidized vapors of said magnetic metal during said deposition.

6. A method as in claim 5, wherein the substrate is cooled to remain at a temperature approximately equal to room temperature during said deposition.

7. A process as in claim 5, wherein a portion of the partially oxidized vapors of said magnetic metal is first deposited on the substrate, and then another portion of the partially oxidized vapors of said magnetic metal is ionized to an increased speed by application of an electric field of d.c. or a.c. power during the deposition of the partially oxidized vapors of said magnetic metal on the substrate.

8. A method for manufacturing a perpendicular type magnetic recording member, comprising the steps of:
providing a substrate for said magnetic recording member in an evacuated vacuum chamber;
introducing oxygen gas into the vacuum chamber while simultaneously sputtering in the vacuum chamber at least one magnetic metal and depositing the sputtered magnetic metal on said substrate, whereby a partially oxidized deposit of said magnetic metal is formed on said substrate, wherein the temperature of the substrate is approximately equal to room temperature during said deposition; and
controlling the proportion of said magnetic metal and controlling the oxygen pressure so as to obtain a perpendicular magnetic film having a predetermined composition.

9. A method as in claim 8, wherein the sputtering is carried out by using the substrate as an electrode or placing an electrode near the substrate, and applying an electric voltage of d.c. or a.c. power to the electrode.

10. A method as in claim 8, wherein the substrate is cooled to remain at a temperature approximately equal to room temperature during said deposition.

* * * * *